(12) United States Patent
Robida et al.

(10) Patent No.: US 7,711,636 B2
(45) Date of Patent: May 4, 2010

(54) SYSTEMS AND METHODS FOR ANALYZING DATA

(75) Inventors: Chuck Robida, Roswell, GA (US); Chien-Wei Wang, Irvine, CA (US)

(73) Assignee: Experian Information Solutions, Inc., Costa Mesa, CA (US)

(*) Notice: Subject to any disclaimer, the term of this patent is extended or adjusted under 35 U.S.C. 154(b) by 436 days.

(21) Appl. No.: 11/535,907

(22) Filed: Sep. 27, 2006

(65) Prior Publication Data

US 2007/0214076 A1    Sep. 13, 2007

Related U.S. Application Data

(60) Provisional application No. 60/781,391, filed on Mar. 10, 2006.

(51) Int. Cl.
*G06Q 40/00* (2006.01)

(52) U.S. Cl. ............... 705/38; 39/36 R; 39/35; 39/4; 39/7; 39/37; 707/100; 340/5.4; 706/21; 706/46; 364/408

(58) Field of Classification Search .......... 705/35, 705/36–39, 7; 364/408; 706/46, 21
See application file for complete search history.

(56) References Cited

U.S. PATENT DOCUMENTS

| | | | |
|---|---|---|---|
| 5,583,763 A | 12/1996 | Atcheson et al. | |
| 5,802,142 A | 9/1998 | Browne | |
| 5,822,410 A | 10/1998 | McCausland et al. | |
| 6,119,103 A * | 9/2000 | Basch et al. ............... | 705/35 |
| 6,202,053 B1 | 3/2001 | Christiansen et al. | |

(Continued)

FOREIGN PATENT DOCUMENTS

JP    2003016261 A    1/2003

(Continued)

OTHER PUBLICATIONS eFunds Corporation, "Data & Decisioning," Debit Report as downloaded from http://www.efunds.com/web/industry-solutions/financial-services/fr.... on Apr. 1, 2007.

(Continued)

*Primary Examiner*—Harish T. Dass
(74) *Attorney, Agent, or Firm*—Knobbe, Martens, Olson & Bear, LLP

(57) ABSTRACT

Information regarding individuals that fit a bad performance definition, such as individuals that have previously defaulted on a financial instrument or have declared bankruptcy, is used to develop a model that is usable to determine whether an individual that does not fit the bad performance definition is more likely to subsequently default on a financial instrument or to declare bankruptcy. The model may be used to generate a score for each individual, and the score may be used to segment the individual into a segment of a segmentation structure that includes individuals with related scores, where segments may include different models for generating a final risk score for the individuals assigned to the particular segments. Thus, the segment to which an individual is assigned, which may be determined based at least partly on the score assigned to the individual, may affect the final risk score that is assigned to the individual.

9 Claims, 15 Drawing Sheets

U.S. PATENT DOCUMENTS

| | | |
|---|---|---|
| 6,430,539 B1 | 8/2002 | Lazarus et al. |
| 6,640,215 B1 | 10/2003 | Galperin et al. |
| 6,823,319 B1 | 11/2004 | Lynch et al. |
| 6,839,682 B1 | 1/2005 | Blume et al. |
| 7,120,599 B2 | 10/2006 | Keyes |
| 7,383,215 B1* | 6/2008 | Navarro et al. ............ 705/36 R |
| 2001/0039523 A1 | 11/2001 | Iwamoto |
| 2001/0044766 A1 | 11/2001 | Keyes |
| 2002/0165839 A1 | 11/2002 | Taylor et al. |
| 2003/0046223 A1 | 3/2003 | Crawford et al. |
| 2003/0065563 A1 | 4/2003 | Elliott et al. |
| 2003/0097329 A1 | 5/2003 | Nabe et al. |
| 2003/0195830 A1 | 10/2003 | Merkoulovitch et al. |
| 2003/0212618 A1 | 11/2003 | Keyes et al. |
| 2003/0217003 A1 | 11/2003 | Weinfalsh et al. |
| 2003/0236738 A1 | 12/2003 | Lange et al. |
| 2004/0030667 A1 | 2/2004 | Xu et al. |
| 2004/0044615 A1 | 3/2004 | Xue et al. |
| 2004/0044617 A1 | 3/2004 | Lu |
| 2004/0111358 A1 | 6/2004 | Lange et al. |
| 2004/0111363 A1 | 6/2004 | Trench et al. |
| 2004/0177030 A1 | 9/2004 | Shoham |
| 2004/0193535 A1 | 9/2004 | Barazesh |
| 2004/0199456 A1 | 10/2004 | Flint et al. |
| 2005/0027632 A1 | 2/2005 | Zeitoun et al. |
| 2005/0086579 A1 | 4/2005 | Leitner et al. |
| 2005/0102226 A1 | 5/2005 | Oppenheimer et al. |
| 2005/0125350 A1 | 6/2005 | Tidwell et al. |
| 2005/0130704 A1 | 6/2005 | McParland et al. |
| 2005/0154664 A1* | 7/2005 | Guy et al. .................... 705/35 |
| 2005/0278246 A1 | 12/2005 | Friedman et al. |
| 2005/0279824 A1 | 12/2005 | Anderson et al. |
| 2006/0059073 A1 | 3/2006 | Walzak |
| 2006/0129428 A1 | 6/2006 | Wennberg |
| 2006/0241923 A1 | 10/2006 | Xu et al. |
| 2006/0242049 A1 | 10/2006 | Haggerty et al. |
| 2006/0242051 A1 | 10/2006 | Haggerty et al. |
| 2006/0282359 A1 | 12/2006 | Nobili et al. |

FOREIGN PATENT DOCUMENTS

| | | |
|---|---|---|
| TW | 256569 B | 6/2006 |
| WO | WO 2004/114160 A2 | 12/2004 |
| WO | WO 2006/099492 A2 | 9/2006 |

OTHER PUBLICATIONS

Jacob, Katy et al., "A Case Study of Checking Account Inquiries and Closures in Chicago," The Center for Financial Services Innovation, Nov. 2006.

International Search Report for PCT/US2007/06070, filed Mar. 9, 2007.

Written Opinion for PCT/US2007/06070, filed Mar. 9, 2007.

International Search Report for PCT/US2007/063822, filed Mar. 12, 2007.

International Search Report and Written Opinion for PCT/US2007/63822, filed Mar. 12, 2007.

International Search Report and Written Opinion for PCT/US2007/63823, filed Mar. 12, 2007.

International Search Report and Written Opinion for PCT/US2007/63824, filed Mar. 12, 2007.

* cited by examiner

SYSTEMS AND METHODS FOR ANALYZING DATA

This application claims priority under 35 U.S.C. § 119(e) to U.S. Provisional Application Ser. No. 60/781,391, filed on Mar. 10, 2006, which is hereby expressly incorporated by reference in its entirety.

BACKGROUND OF THE INVENTION

1. Field of the Invention

This invention is related to analysis of data related to a plurality of individuals in order to categorize the individuals. More particularly, the invention is related to analysis of financial and demographic information of individuals in order to categorize the individuals, assign risks for future delinquencies to the individuals, and return reasons for assignment of a particular risk to an individual.

2. Description of the Related Art

Lending institutions provide credit accounts such as mortgages, automobile loans, credit card accounts, and the like, to consumers. Prior to providing an account to an application, or applicants, however, many of these institutions review credit related data and demographic data associated with the applicant in order to determine a risk of the applicant defaulting on the account or filing for bankruptcy, for example. Such credit and demographic data may be used to categorized, or segment, individuals into one of a plurality of segments where each segment is associated with other individuals that each have certain similar attributes. Scoring models that may be particular to the assigned segment may then be applied to the individual in order to determine a risk score that is used by the lending institution to assess a risk level associated with the applicant.

SUMMARY

In one embodiment, information regarding individuals that fit a bad performance definition, such as individuals that have previously defaulted on a financial instrument or have declared bankruptcy, is used to develop a model that is usable to determine whether an individual that does not fit the bad performance definition is more likely to subsequently default on a financial instrument or to declare bankruptcy. The model may be used to generate a score for each individual, and the score may be used to segment the individual into a segment of a segmentation structure that includes individuals with related characteristics, where segments may include different models for generating a final risk score for the individuals assigned to the particular segments. Thus, the segment to which an individual is assigned, which may be determined based at least partly on the score assigned to the individual, may affect the final risk score that is assigned to the individual.

In another embodiment, a method of generating a default/bankruptcy model for assigning an individual to particular segments of a segmentation structure, wherein the default/bankruptcy model is indicative of an individual's propensity to either default on one or more financial instruments or file for bankruptcy comprises, receiving observation data comprising financial and demographic information regarding a plurality of individuals, the observation data indicating characteristics of the individuals at an observation time, receiving outcome data comprising financial and demographic information regarding the plurality of individuals fitting a bad performance definition, the outcome data indicating characteristics of the individuals fitting the bad performance definition during an outcome period, the outcome period beginning after the observation time, and comparing the observation data and the outcome data in order to generate the bankruptcy/default model usable to determine which of a plurality of segments in the segmentation structure a particular individual should be assigned.

In another embodiment, a method of assessing a risk associated with an individual comprises generating a model based on data regarding a first subgroup of a population, the subgroup comprising a first portion fitting a first failure definition and a second portion fitting a second failure definition, and applying the generated model to the individual, wherein the individual is not a member of the first subgroup.

In another embodiment, a computing system for segmenting each of a plurality of individuals into one of a plurality of segments of a segmentation structure comprises a profile module configured to generate a default/bankruptcy model for assigning each individual to one or more segments of the segmentation structure, wherein the default/bankruptcy model is indicative of an individual's propensity to either default on one or more financial instruments or to file for bankruptcy, and a segmentation module configured to segment each of the individuals using the default/bankruptcy model, wherein the individuals include individuals satisfying a bad performance definition and individuals satisfying a good performance definition.

In another embodiment, a method for selecting one or more adverse action codes to associate with a final risk score assigned to an individual, each of the adverse action codes indicating a reason that the final risk score was assigned to the individual, wherein the individual is assigned to a segmentation hierarchy comprising a plurality of segments, including a final segment, in a segmentation structure comprises determining a first penalty associated with assignment of the individual to a final segment, determining a first ratio of the first penalty to a difference between a highest possible final risk score and the final risk score for the individual, if the determined first ratio is above a first determined threshold, allotting an adverse action code related to assignment of the individual to the final segment.

In another embodiment, a method of generating a model for determining an individual's propensity to enter either a first failure mode or a second failure mode comprises defining a bad performance definition to include individuals that have characteristics of one or more of the first and second failure modes, receiving observation data regarding a plurality of individuals fitting the bad performance definitions, the observation data indicating characteristics of the individuals at an observation time, receiving outcome data regarding the plurality of individuals fitting the bad performance definition, the outcome data indicating characteristics of the individuals fitting the bad performance definition during an outcome period, the outcome period beginning after the observation time, and comparing the observation data and the outcome data in order to generate a model usable to determine a likelihood that an individual not fitting the bad performance definition will enter a first failure mode or if the individual will enter the second failure mode.

DETAILED DESCRIPTION OF CERTAIN EMBODIMENTS

Embodiments of the invention will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the invention. Furthermore, embodiments of the invention may include several novel features, no single one of which is solely responsible for its desirable attributes or which is essential to practicing the inventions described herein.

Figure 1:
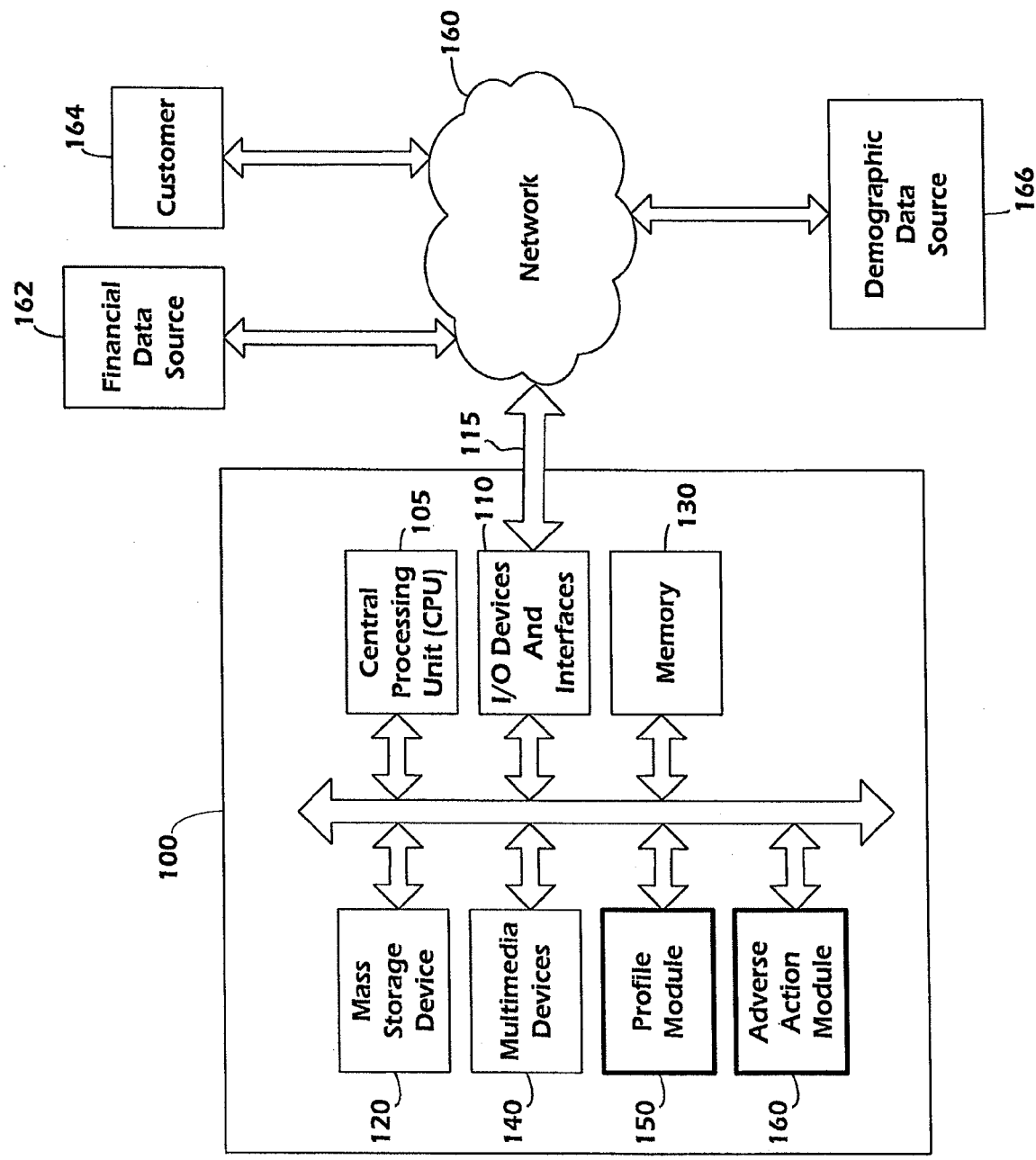
FIG. 1 is one embodiment of a block diagram of a computing system that is in communication with a network and various devices that are also in communication with the network.

FIG. 1 is one embodiment of a block diagram of a computing system 100 that is in communication with a network 160 and various devices that are also in communication with the network 160. The computing system 100 may be used to implement certain systems and methods described herein. For example, in one embodiment the computing system 100 may be configured to receive financial and demographic information regarding individuals and generate risk scores for the individuals. The functionality provided for in the components and modules of computing system 100 may be combined into fewer components and modules or further separated into additional components and modules.

In general, the word module, as used herein, refers to logic embodied in hardware or firmware, or to a collection of software instructions, possibly having entry and exit points, written in a programming language, such as, for example, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

The computing system 100 includes, for example, a personal computer that is IBM, Macintosh, or Linux/Unix compatible. In one embodiment, the exemplary computing system 100 includes a central processing unit ("CPU") 105, which may include a conventional microprocessor. The computing system 100 further includes a memory 130, such as random access memory ("RAM") for temporary storage of information and a read only memory ("ROM") for permanent storage of information, and a mass storage device 120, such as a hard drive, diskette, or optical media storage device. Typically, the modules of the computing system 100 are connected to the computer using a standards based bus system. In different embodiments, the standards based bus system could be Peripheral Component Interconnect (PCI), Microchannel, SCSI, Industrial Standard Architecture (ISA) and Extended ISA (EISA) architectures, for example.

The computing system 100 is generally controlled and coordinated by operating system software, such as the Windows 95, 98, NT, 2000, XP, Linux, SunOS, Solaris, or other compatible operating systems. In Macintosh systems, the operating system may be any available operating system, such as MAC OS X. In other embodiments, the computing system 100 may be controlled by a proprietary operating system. Conventional operating systems control and schedule computer processes for execution, perform memory management, provide file system, networking, and I/O services, and provide a user interface, such as a graphical user interface ("GUI"), among other things.

The exemplary computing system 100 includes one or more commonly available input/output (I/O) devices and interfaces 110, such as a keyboard, mouse, touchpad, and printer. In one embodiment, the I/O devices and interfaces 110 include one or more display device, such as a monitor, that allows the visual presentation of data to a user. More particularly, a display device provides for the presentation of GUIs, application software data, and multimedia presentations, for example. The computing system 100 may also include one or more multimedia devices 140, such as speakers, video cards, graphics accelerators, and microphones, for example.

In the embodiment of FIG. 1, the I/O devices and interfaces 110 provide a communication interface to various external devices. In the embodiment of FIG. 1, the computing system 100 is coupled to a network 160, such as a LAN, WAN, or the Internet, for example, via a wired, wireless, or combination of wired and wireless, communication link 115. The network 160 communicates with various computing devices and/or other electronic devices via wired or wireless communication links. In the exemplary embodiment of FIG. 1, the network 160 is coupled to a financial data source 162, such as a bank or other financial institution, a demographic data source 166, such as a government public information database, and a customer 164, such as a financial institution that is interested in the financial risks associated with particular individual. The information supplied by the various data sources may include credit data, demographic data, application information, product terms, accounts receivable data, and financial statements, for example. In addition to the devices that are illustrated in FIG. 1, the network 160 may communicate with other data sources or other computing devices.

In the embodiment of FIG. 1, the computing system 100 also includes two application modules that may be executed by the CPU 105. In the embodiment of FIG. 1, the application modules include the profile module 150 and the adverse action module 160, which are discussed in further detail below. Each of these application modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In the embodiments described herein, the computing system 100 is configured to execute the profile module 150 and/or the adverse action module 160, among others, in order to provide risk information regarding certain individuals or entities. For example, in one embodiment the computing system 100 generates risk scores for individuals, where the risk scores indicate a financial risk associated with the individual. In one embodiment, the customer 164 is a financial institution interested in the risk of default or late payments on a loan or credit card account that has been applied for by an individual. Thus, the computing system 100 may be configured to analyze data related to the individual from various data sources in order to generate a risk score and provide the risk score to the customer 164. In one embodiment, multiple financial accounts, such as bank accounts, credit card accounts, and loan accounts, are associated with each individual. Thus, the computing system 100 analyzes data regarding multiple accounts of individuals and determines scores for the individuals that are usable by one or more customers. Various other types of scores, related to other types of risks, may also be generated by the computing system 100. Although the description provided herein refers to individuals, the term individual should be interpreted to include groups of individuals, such as, for example, married couples or domestic partners, and business entities.

Figure 7:
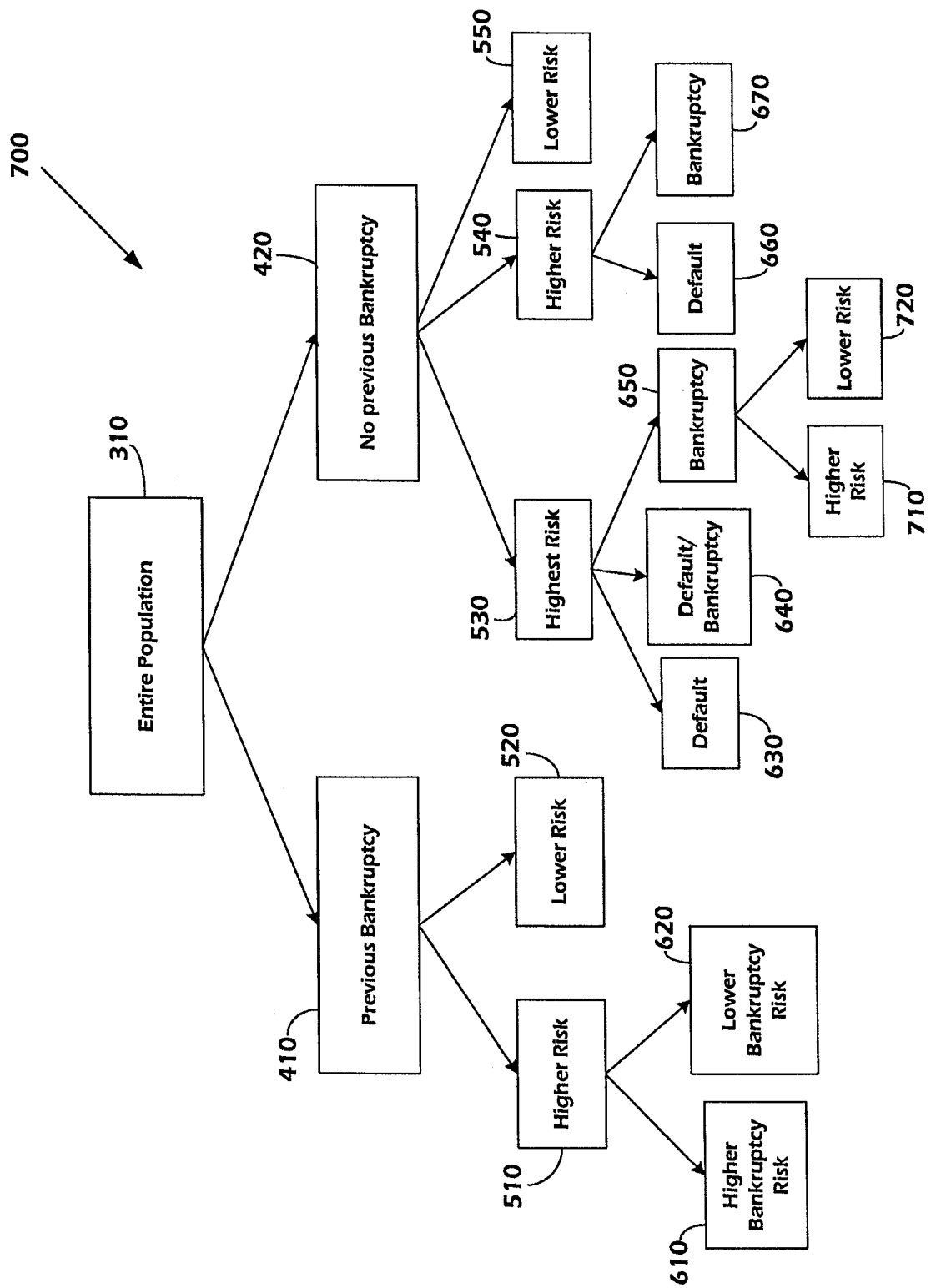
FIG. 7 illustrates one embodiment of a segmentation structure having five levels of segments.

In one embodiment, the computing system 100 executes the profile module 150, which is configured to analyze data received from one or more data sources and generate a profile model that is usable to assign individuals to groups. The groups to which individuals may be assigned may also be referred to as segments and the process of assigning accounts to particular segments may be referred to as segmentation. A segmentation structure may include multiple segments arranged in a tree configuration, wherein certain segments are parents, or children, of other segments. A segment hierarchy includes the segment to which an individual is assigned and each of the parent segments to the assigned segment. FIG. 7, described in detail below, illustrates a segmentation structure having multiple levels of segments to which individuals may be assigned. In one embodiment, the segments are each configured to be associated with individuals that each have certain similar attributes.

After assigning a score to an individual, the computing system 100 may also select and provide reasons related to why the individual was assigned a particular score. For example, many customers request information regarding the factors that had the most impact on an individual's risk score. Thus, in one embodiment the computing system 100 selects one or more adverse action codes that are indicative of reasons that a particular score was assigned to an individual. In certain embodiments, the assignment of an individual to a particular segment may be a factor that was relevant in arriving at the risk score for the individual. Thus, in one embodiment, one or more adverse action codes provided to a customer may be related to the assignment of the individual to a particular segment, or to particular segments in the segment hierarchy. In one embodiment, the adverse action module 160 is configured to determine how many, if any, of a determined number of total adverse action codes should be allotted to various segments of the individuals segment hierarchy. The adverse action module 160 may also determine which adverse action codes are returned. The operation of the profile module 150 and the adverse action module 160 are explained further below with respect to the drawings.

I. Segmentation

Figure 2:
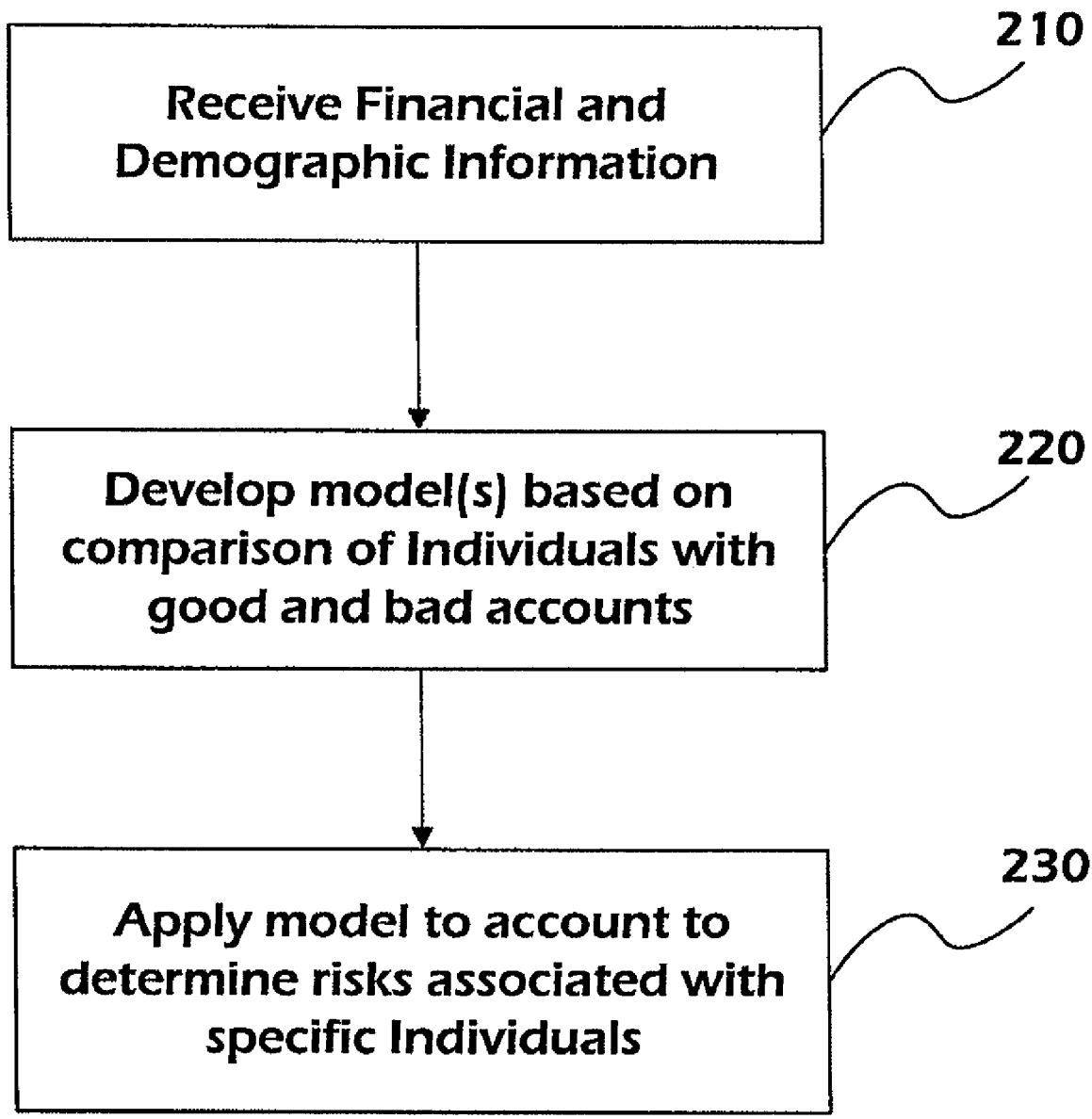
FIG. 2 is one embodiment of a flowchart illustrating an exemplary method of analyzing data to create a model.

FIG. 2 is one embodiment of a flowchart illustrating an exemplary method of analyzing data to create a model. The exemplary method of analyzing data may be stored as a process accessible by the profile module 120 and/or other components of the computing system 100. As described above, models may be created based on existing data in an attempt to predict characteristics of other related data. Depending on the embodiment, certain of the blocks described below may be removed, others may be added, and the sequence of the blocks may be altered.

Beginning in a block 210, financial and demographic information is received by a computing device, such as the computing device 100 of FIG. 1. The financial and demographic data may be received from various data sources, including those discussed above with reference to FIG. 1. In the embodiment of FIG. 2, financial and demographic information related to a plurality of individuals, and a plurality of financial accounts associated with the individuals, is obtained. Thus, for any given individual, data regarding characteristics of multiple financial accounts may be received. In addition, the received data may be a subset of the available data, such as, for example males older than 40, or a random 10% sample of the population. In an advantageous embodiment, the received data is in a format that is easily understood and usable by the computing system 100. It is recognized that in other embodiments, the data could be retrieved in block 210, such as, for example, by reading data stored on one or more data source via the network 160

Moving to a block 220, one or more models are developed based on a comparison of the received data. In the embodiment of FIG. 2, a model is generated by comparing characteristics of individuals that are classified as fitting either a good or a bad definition. In one embodiment, for example, a bad performance definition is associated with individuals having at least one account that has had a 90+ days past due status within the previous two years, for example, while the good performance definition is associated with individuals that have not had a 90+ days past due status on any accounts within the previous two years. It is recognized that in other scenarios, individuals with at least one account that is 90+ days past due may be classified as a good performance definition. As those of skill in the art will recognize, the specific criteria for being categorized in either the good or bad performance definitions may vary greatly and may consider any available data, such as data indicating previous bankruptcy, demographic data, and default accounts associated with an individual, for example.

Continuing to a block 230, the developed model is applied to an individual in order to determine risks associated with the individual. For example, the model may be used to determine if an individual is more closely related to the individuals associated with the good performance definition, or with individuals associated with the bad performance definition. Thus, application of the model on an individual may predict whether the individual will have past due account statuses in the future, for example. Accordingly, the generated model may be used by customers in order to determine what types of financial services should be offered to a particular individual, if any, and rates, such as interest rates, for the individual may be proportional to the risk score developed by application of the model to the individual.

Figure 2A:
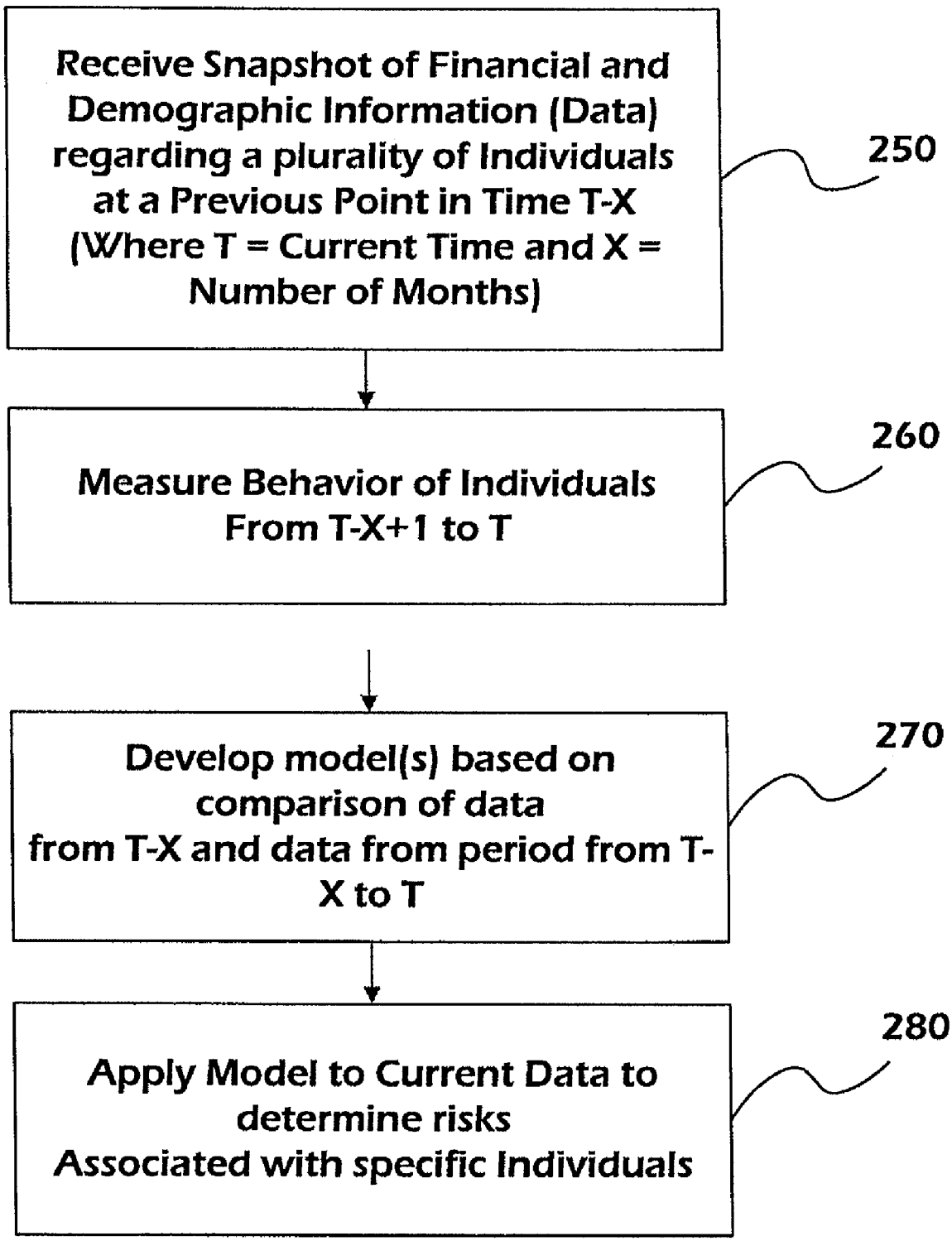
FIG. 2A is another embodiment of a flowchart illustrating an exemplary method of analyzing data from multiple points in time in order to create a model.

FIG. 2A is another embodiment of a flowchart illustrating an exemplary method of analyzing data from multiple points in time in order to create a model. In this embodiment, the model may be created based on analyzing data from a previous point in time (an observation point) in an attempt to predict known behavior as measured subsequent to the observation point (during an outcome period). More particularly, the model is generated by analysis of the data from the observation point, referred to as observation data, in context of the data from the outcome period, referred to as outcome data. Once generated, the model may be applied to individuals, based on the current data related to the individual at the time of applying the model. Depending on the embodiment, certain of the blocks described below may be removed, others may be added, and the sequence of the blocks may be altered.

Beginning in a block 250, a snapshot of financial and demographic information regarding a plurality of individuals at a particular point in time is received. In the embodiment of FIG. 2A, the observation point is some time previous to the current time and may be expressed generally as T-X, where T is the current time and X is a number of months. In one embodiment, T=the date the profile model is being generated. In this embodiment, if X=25, the observation point is 25 months previous to the date the profile model is being generated. In other embodiments, X may be set to any other time period, such as 6, 12, 18, 36, or 48, for example.

Continuing to a block 260, data related to individuals during a period subsequent and mutually exclusive to the observation point is obtained. In one embodiment, this outcome period may be defined generally as the period from T-X+1 to T, is obtained. Thus, in an exemplary embodiment where X=25, data from the individuals from 24 months previous until the date of model generation, is obtained. Behaviors measured for individuals during the outcome period may include, for example, repayment performance, bankruptcy filing, and response to a marketing offer. These behaviors may be referred to as the performance definition of the analysis.

Moving to a block 270, the observation data and the outcome data relative to the categories of the performance definition are analyzed in order to develop a model. Thus, data regarding the individuals at the snapshot date is compared to data regarding the individuals during the outcome period.

In a block 280, the model developed in block 270 may be applied to current data of an individual in order to predict future behavior or attributes of the individual over a time period. In one embodiment, the model is applied to a snapshot of the financial and demographic data related to the individual at the time of model application. Thus, the data used in applying the model may be predictive during any time after T, such as T+1, T+6, T+12, or T+24, for example. With respect to the example above, application of a model generated using X=25 may result in information that predicts an individual's behavior for a subsequent 24 month period.

As described in further detail below, generation of a model using data related to a certain subpopulation of all individuals received may advantageously be used to predict certain characteristics of even individuals outside the subpopulation used in development of the model. In particular, described below are exemplary systems and methods for generating a model for segmenting individuals based on whether the individual is more likely to default on one or more financial instruments, or whether the individual is more likely to file for bankruptcy. Thus, the model is generated by comparing individuals that are associated with default accounts and/or bankruptcy during the outcome period, which are each individuals classified in the bad performance definition. However, although the model is generated using only individuals that fit the bad performance definition, the generated model is used to segment individuals that do not fit the bad performance definition. For example, the model may be applied to individuals that are not associated with default accounts or bankruptcy observed during the outcome period. By applying a model generated from a first subgroup of a population (for example, bad performance definition individuals) to a second subgroup of the population (for example, any individuals, include good and bad performance definition individuals), certain attributes of the first subgroup are usable to predict risk characteristics of the second subgroup that may not be detectable using a traditional model.

Figure 3:
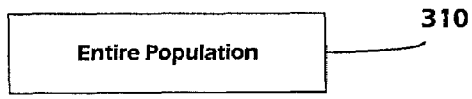
FIG. 3 illustrates one embodiment of a segmentation structure having a single segment.

FIGS. 3-7 are segmentation structures illustrating embodiments of levels of segments that may be included in a segmentation structures. The exemplary segmentation structure of FIG. 3 illustrates an embodiment of a first level of a segmentation structure, while the segmentation structures of FIGS. 3-7 each add an additional segmentation level to the segmentation structure. In one embodiment, the segmentation structures of FIGS. 3-7 may be based on observation data. The description of FIGS. 3-7 also describes exemplary steps of applying a model in order to segment an individual to a particular segment, and then to apply a model to the individual in order to determine an individual risk score. The segmentation structure discussed in these drawings provides one exemplary segmentation structure that may be use to categorize individuals. Thus, the segmentation structures described herein are not intended to limit the scope of segmentation structures that may be used in conjunction with the profile model generation and application systems and methods described herein.

FIG. 3 illustrates one embodiment of a segmentation structure having a single segment 310. In the embodiment of FIG. 3, all individuals are assigned to the segment 310. In one embodiment, segment 310 comprises a scoring model that may be applied to individuals within the segment in order to determine a preliminary risk score for the individuals. In one embodiment, because segment 310 includes all individuals, segment 310 may be considered a starting segment in which any individual is placed, rather than a segment 310 to which individuals may be assigned using one or more scoring criteria or attributes of the individuals.

Figure 4:
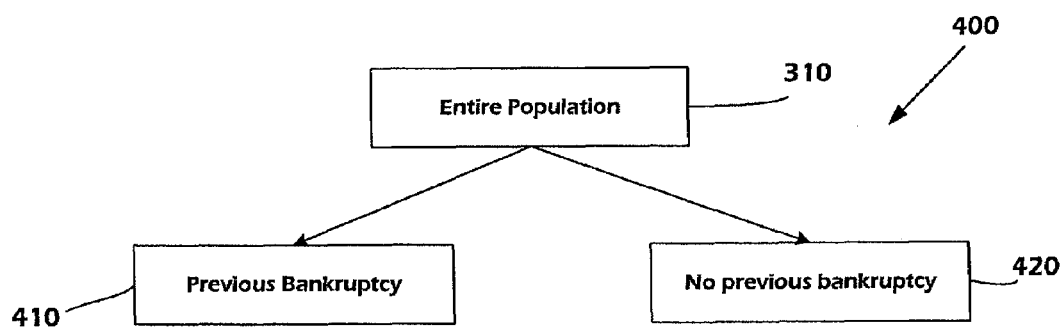
FIG. 4 illustrates one embodiment of a segmentation structure having two levels of segments.

FIG. 4 illustrates one embodiment of a segmentation structure having first and second levels of segments. More particularly, the segmentation structure 400 includes the first level segment 310 and two second level segments 410, 420 that are each connected as children nodes of the first level segment 310. In the embodiment of FIG. 4, segment 410 is associated with individuals that have one or more previous bankruptcies, while segment 420 is associated with individuals that have no previous bankruptcies. Thus, each individual in the entire population segment 310 may be assigned to one, and only one, of the second level segments 410, 420. More particularly, each individual either has a previous bankruptcy, or does not have a previous bankruptcy, and may therefore be assigned to exactly one of the second level segments 410 or 420. In other embodiments, some of the individuals may remain in the first level segment 310, while others are assigned to second level segments, such as segments 410, 420.

Figure 5:
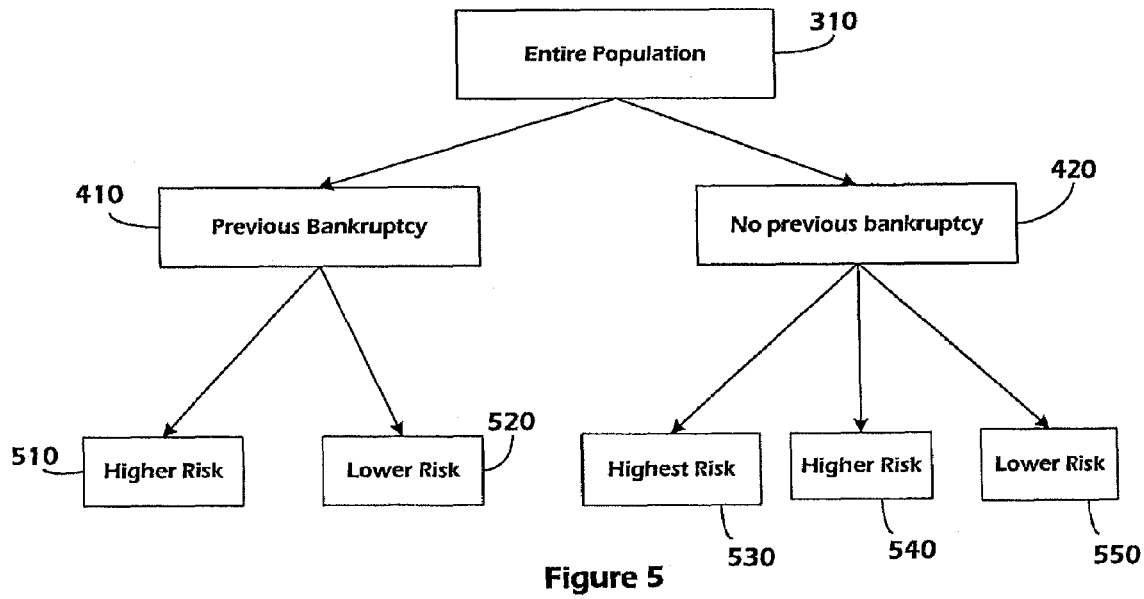
FIG. 5 illustrates one embodiment of a segmentation structure having three levels of segments.

FIG. 5 illustrates one embodiment of a segmentation structure having first, second, and third level segments. In the embodiment of FIG. 5, third level segments 510, 520 have been associated as children nodes of second level segment 410, and third level segments 530, 540, and 550 have been associated as children nodes of second-level segment 420. Thus, as illustrated in FIG. 5, individuals that are segmented to the previous bankruptcy segment 410 may be further segmented to either a higher risk segment 510 or a lower risk segment 520. Likewise, individuals that are segmented to the no previous bankruptcy segment 420 may be further segmented in either a highest risk segment 530, higher risk segment 540, or lower risk segment 550. Accordingly, the third level segments further divide and classify the individuals that are assigned to the second level segments. In one embodiment, assignment of individuals to one of the third level segments is determined according to a preliminary risk score for each particular count. The preliminary risk score may be determined based on a model that is developed for application to any individual in the entire population segment 310, based on certain attributes of each individual. In the embodiment of FIG. 5, the preliminary risk score is used in segmenting accounts into one of the third level segments, rather than directly as a factor in the model for determining a final risk score.

Figure 6:
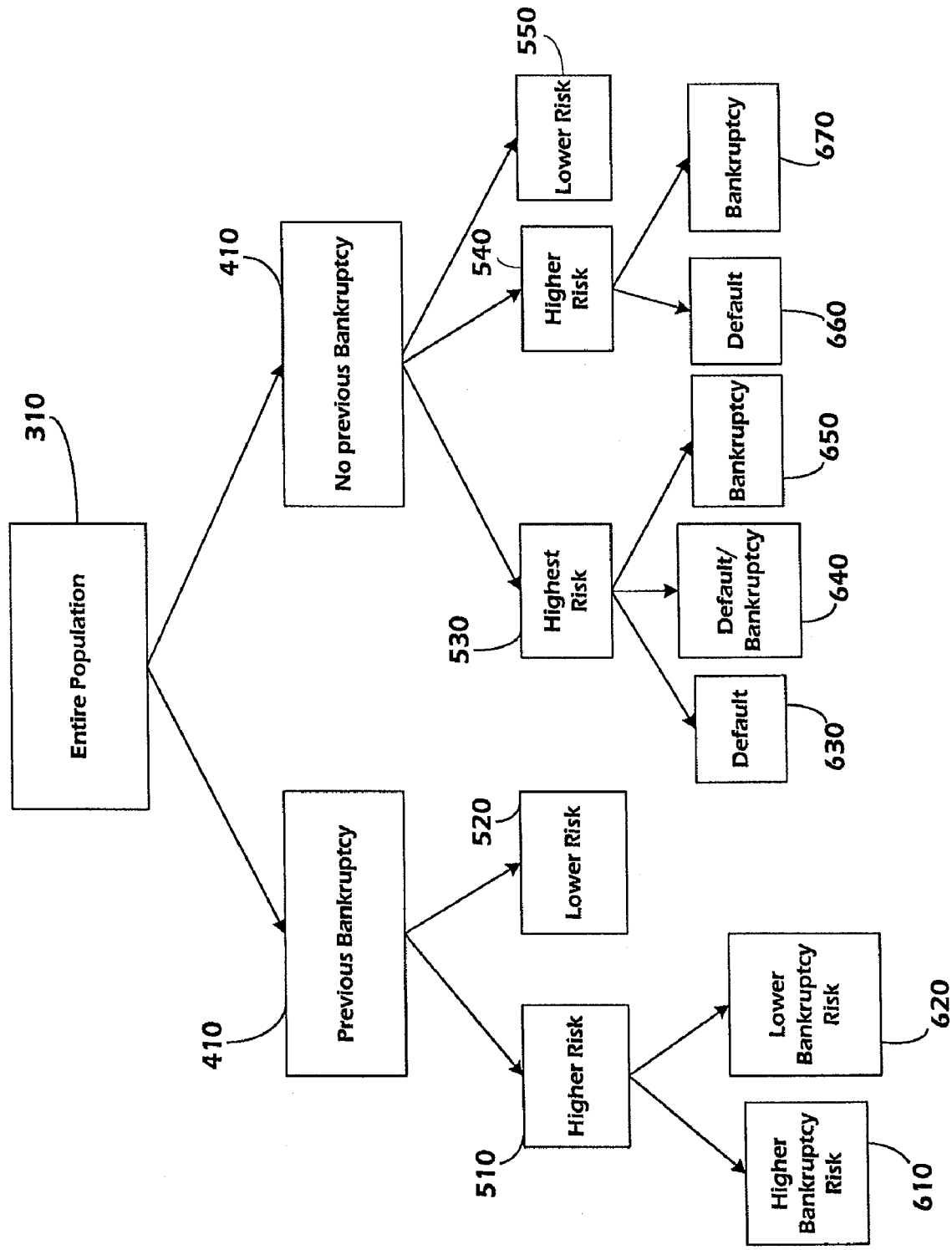
FIG. 6 illustrates one embodiment of a segmentation structure having four levels of segments.

FIG. 6 illustrates one embodiment of a segmentation structure having first, second, third, and fourth level segments. In the embodiment of FIG. 6, the third level higher risk segment 510 is further segmented into fourth level segments including a higher bankruptcy risk segment 610 and a lower bankruptcy risk segment 620. Similarly, the highest risk segment 530 is further segmented into a default segment 630, default/bankruptcy segment 640, and a bankruptcy segment 650. The higher risk segment 540 is further segmented into a default segment 660 and a bankruptcy segment 670. In an advantageous embodiment, a default/bankruptcy profile model is developed by analyzing individuals that are associated with a default account and/or bankruptcy during the outcome period. This default/bankruptcy profile model may then be applied to individuals within the higher risk segment 510, highest risk segment 530, or higher risk segment 540, in order to determine how each of the individuals should be further segmented into one of the fourth level segments. Thus, although the default/bankruptcy profile model is developed using only individuals that are associated with a previous default account and/or bankruptcy, the model may be useful in segmenting individuals that are not associated with default accounts or bankruptcy.

FIG. 7 illustrates one embodiment of the segmentation structure of FIG. 6 having first through fifth level segments. In the embodiment of FIG. 7, the bankruptcy segment 650 is further subdivided into higher risk segment 710 and lower risk segment 720. In one embodiment, assignment of individuals to either the higher risk segment 710 or the lower risk segment 720 is determined according to preliminary risk scores for respective individuals. In other embodiments, other criteria may be used to segment individuals into the higher risk segment 710 or the lower risk segment 720.

Figure 8:
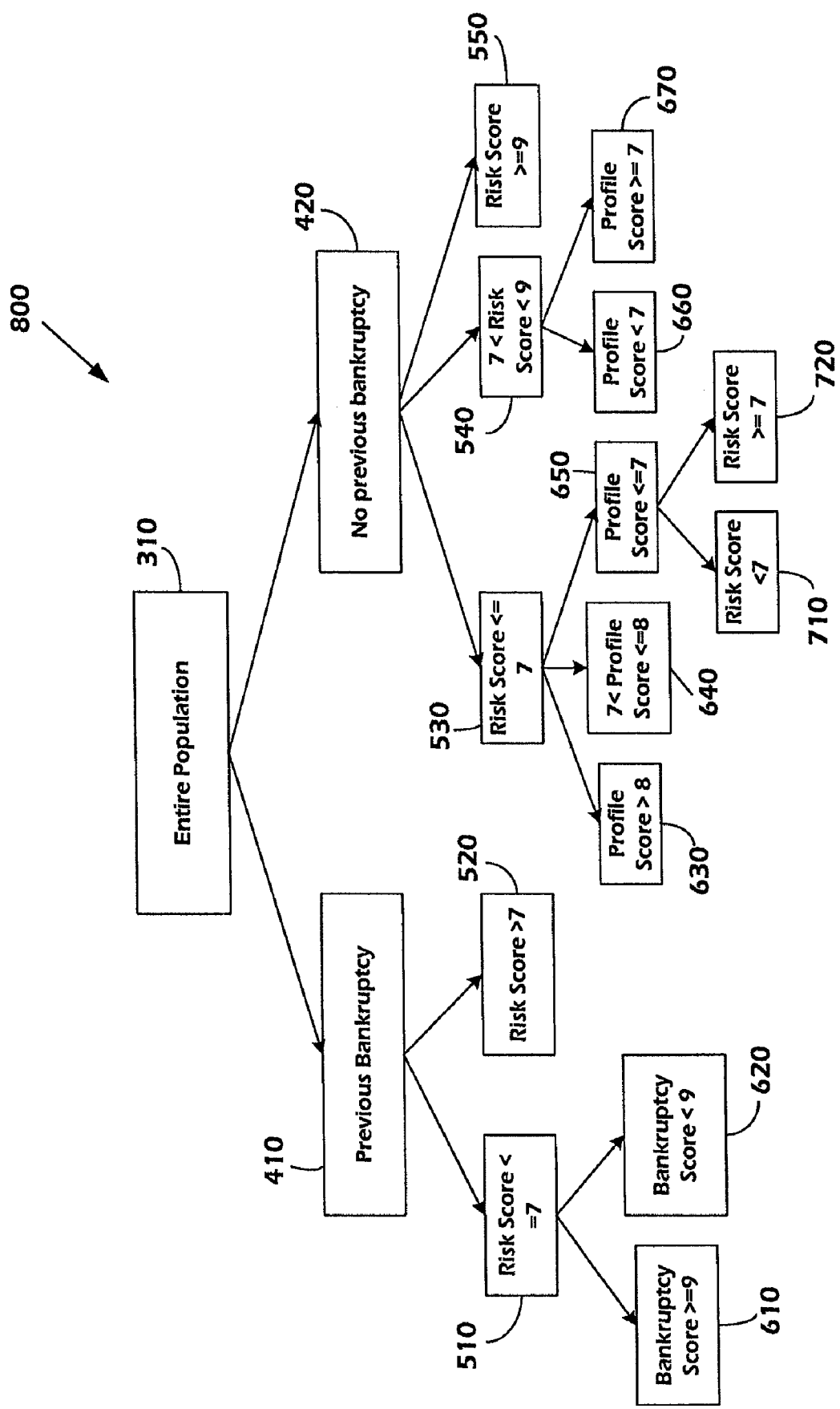
FIG. 8 illustrates one embodiment of the segmentation structure of FIG. 7 replacing the segment captions with criteria for assigning individuals to each segment.

FIG. 8 illustrates one embodiment of the segmentation structure of FIG. 7 replacing the segment captions with criteria for assigning individuals to each segment. Accordingly, the segmentation structure 700 may be used to assign an individual to a particular segment in the segmentation structure, based on various attributes of accounts held by the individual at the time of observation or application of the model. The criteria include in FIG. 8 are exemplary and are not intended to limit the types or ranges of criteria that may be used in segmenting individuals. In the embodiment of FIG. 8, the preliminary risk scores assigned to individuals range in values from 0 to 10, with 10 representing the least amount of risk; the default/bankruptcy scores range in values from 0 to 10, with 10 representing the greatest risk of default and 0 representing the greatest risk of bankruptcy; and the preliminary bankruptcy scores range in values from 0 to 10, with 10 representing the greatest risk of bankruptcy and 0 representing the least risk of bankruptcy. However, these ranges of values are exemplary and are not intended to limit the scope of the systems and methods described herein. Other scores, such as letter scores from A-F may be used as preliminary risk scores, default/bankruptcy scores, and/or preliminary bankruptcy scores. In other embodiments, higher values may represent different attributes of an individual than are described above. For example, in one embodiment, the preliminary bankruptcy scores may range in values from 0 to 10, with 0, rather than 10, representing the greatest risk of bankruptcy and 10, rather than 0, representing the least risk of bankruptcy.

In one embodiment, the final segment to which an individual is assigned is associated with a scoring model that is applied to the individual in order to develop a final risk score for the individual. Thus, the criteria included in each of the segments illustrated in FIG. 7 define which individuals should be associated with each particular segment, rather than indicating a particular final risk score associated with an individual. As described further below, certain scoring models associated with segments may adjust a final risk score for an individual due to assignment of the individual to a particular segment and/or assignment to a particular segment hierarchy. For example, in one embodiment a risk score model for higher bankruptcy risk segment 610 may inherently or explicitly adjust final risk scores of individuals in that segment based on the fact that the individuals are assigned to segment 610. In addition, the risk score model for segment 610 may also inherently or explicitly adjust the final risk scores of individuals in that segment based on the fact that the segment hierarchy includes higher risk segment 510 and previous bankruptcy segment 410. Other risk score models, however, may not adjust the final risk score based on assignment to particular segments or segment hierarchies, or may adjust for some, but not all, segments.

In the exemplary embodiment of FIG. 8, at the beginning of the segmentation process, all individuals are placed in the entire population segment 310. The individuals are then segmented into two groups, specifically, previous bankruptcy segment 410 and no previous bankruptcy segment 420. Thus, the determination of a second level segment is based only on whether the individual has previously filed for bankruptcy. As those of skill in the art will recognize, bankruptcy data may be obtained from various sources, such as public records or financial account information that may be available from one or more data sources.

Once an individual is segmented to either the previous bankruptcy segment 410 or the no previous bankruptcy segment 420, further segmentation according to preliminary risk scores is performed. As noted above, in one embodiment a preliminary risk score is determined for each of the individuals in the entire population segment 310. In the embodiment of FIG. 8, for those individuals assigned to the previous bankruptcy segment 410, if the preliminary risk score is less than or equal to seven, the account is assigned to the higher risk segment 510. If, however, an individual from the previous bankruptcy segment 410 has an associated preliminary risk score of greater than seven, the individual is assigned to the lower risk segment 520. Because the segmentation structure 800 does not include any further segments below the lower risk segment 520, a final risk model associated with the lower risk segment 520 may be applied to individuals assigned to segment 520 in order to generate respective final risk scores. However, segmentation structure 700 includes additional segments that are configured as child nodes of the higher risk segment 510 and, accordingly, the final risk score is not determined by a model associated with the higher risk segment 510, but rather by models associated with the child segments.

In the embodiment of FIG. 8, individuals in the higher risk segment 510 are further segmented based on a bankruptcy risk score. In one embodiment, a bankruptcy risk score is calculated for certain, or all, of the individuals in the previous bankruptcy segment 410. In the segmentation structure 700, individuals in the higher risk segment 510 with a bankruptcy risk score that is greater than or equal to nine are assigned to the higher bankruptcy risk segment 610, while individuals in the higher risk segment 510 with a bankruptcy score that is less than nine are assigned to the lower bankruptcy risk segment 620. In one embodiment, each of the higher bankruptcy risk segment 610 and lower bankruptcy risk segment 620 have respective final risk score models that are applied to the individuals assigned to the respective segments in order to determine a final risk score for each individual.

As shown in FIGS. 7 and 8, the previous bankruptcy segment 420 is linked to multiple child segments to which individuals may be segmented. In particular, individuals with a preliminary risk score of less than or equal to seven are assigned to the highest risk segment 530, individuals with a preliminary risk score of less than nine are assigned to the higher risk segment 540, and individuals with a preliminary risk score of greater than or equal to nine are assigned to the lower risk segment 550. Because the segmentation structure 800 does not include any further segments below the lower risk segment 550, a final risk model associated with the lower risk segment 550 is applied to individuals assigned to segment 550 in order to generate respective final risk scores. However, segmentation structure 800 includes additional segments that are configured as child nodes of the highest risk segment 530 and the higher risk segment 540 and, accordingly, the final risk score is not determined by a model associated with the highest risk segment 530 or the higher risk segment 510, but rather by models associated with the child segments.

In the embodiment of FIG. 8, the highest risk segment 530 includes multiple child nodes, specifically, default segment 630, default/bankruptcy segment 640, and bankruptcy segment 650. In one embodiment, individuals in the highest risk segment 530 are segmented into one of the segments 630, 640, or 650 based on a default/bankruptcy profile score. As described in further detail below with reference to FIGS. 9-14, a default/bankruptcy model may be developed based on account information related to individuals within either bankruptcy or default accounts within the outcome period. In one embodiment, individuals associated with default accounts includes those individuals that have had at least one 90 days past due account status in the outcome period. For example, in one embodiment an individual is categorized as default if within the two year outcome period, one or more accounts associated with the individual have reported a 90 days past due status. In one embodiment, the default category individuals and the bankruptcy category are mutually exclusive, so that if an individual satisfies the criteria for being categorized in both the bankruptcy and default categories, only the bankruptcy categorization will be applied to the individual. In other embodiments, other criteria may be used to categorize individuals as default or bankrupt. For example, information regarding 30 days past due, 60 days past due, and 120 days past due accounts of an individual may be used in categorizing individuals as default. Likewise, various time periods may be reviewed in order to locate possible past due accounts and bankruptcy information. For example, the outcome period may be six months, one year, two years, three years, or five years.

As will be described in further detail below, although the default/bankruptcy profile model is developed based on only account data associated with individuals categorized as either default or bankrupt, the default/bankruptcy profile model may advantageously be applied to individuals that are not categorized as either bankrupt or default in order to segment these individuals. For example, as illustrated in FIG. 8, those individuals in the highest risk segment 530 having a default/bankruptcy profile score of greater than 8 are assigned to the default segment 630, those individuals having a default/bankruptcy profile score of greater than seven, but less than or equal to eight, are assigned to the default/bankruptcy segment 640, and those individuals having a default/bankruptcy profile score of less than or equal to seven are assigned to the bankruptcy segment 650. In one embodiment, the assignment of individuals to one of the segments 630, 640, or 650, is indicative of a prediction as to whether the individual is more likely to either default or file for bankruptcy in the future. Thus, those individuals in the default segment 630 are more likely to default on an account in the future then they are to go bankrupt and those individuals in the bankruptcy segment 650 are more likely to declare bankruptcy in the future than to default on an account. In the embodiment of FIG. 8, those individuals in the default/bankruptcy segment 640 are substantially equally likely to either default on an account or to file for bankruptcy.

For those individuals in the higher risk segment 540, the default/bankruptcy profile model is applied and the individuals are further segmented to either the default segment 660 or the bankruptcy segment 670 according to the score returned from application of the default/bankruptcy profile model. More particularly, those individuals with a default/bankruptcy profile score of less than seven are assigned to the default segment 660, while those individuals with a default/bankruptcy profile score of greater than or equal to seven are assigned to the bankruptcy segment 670. As noted above, assignment to the default segment 660 may indicate that an individual is more likely to default on an account than to file for bankruptcy, while assignment to the bankruptcy segment 670 may indicate that an individual is more likely to file for bankruptcy then you default on an account.

Figure 8A:
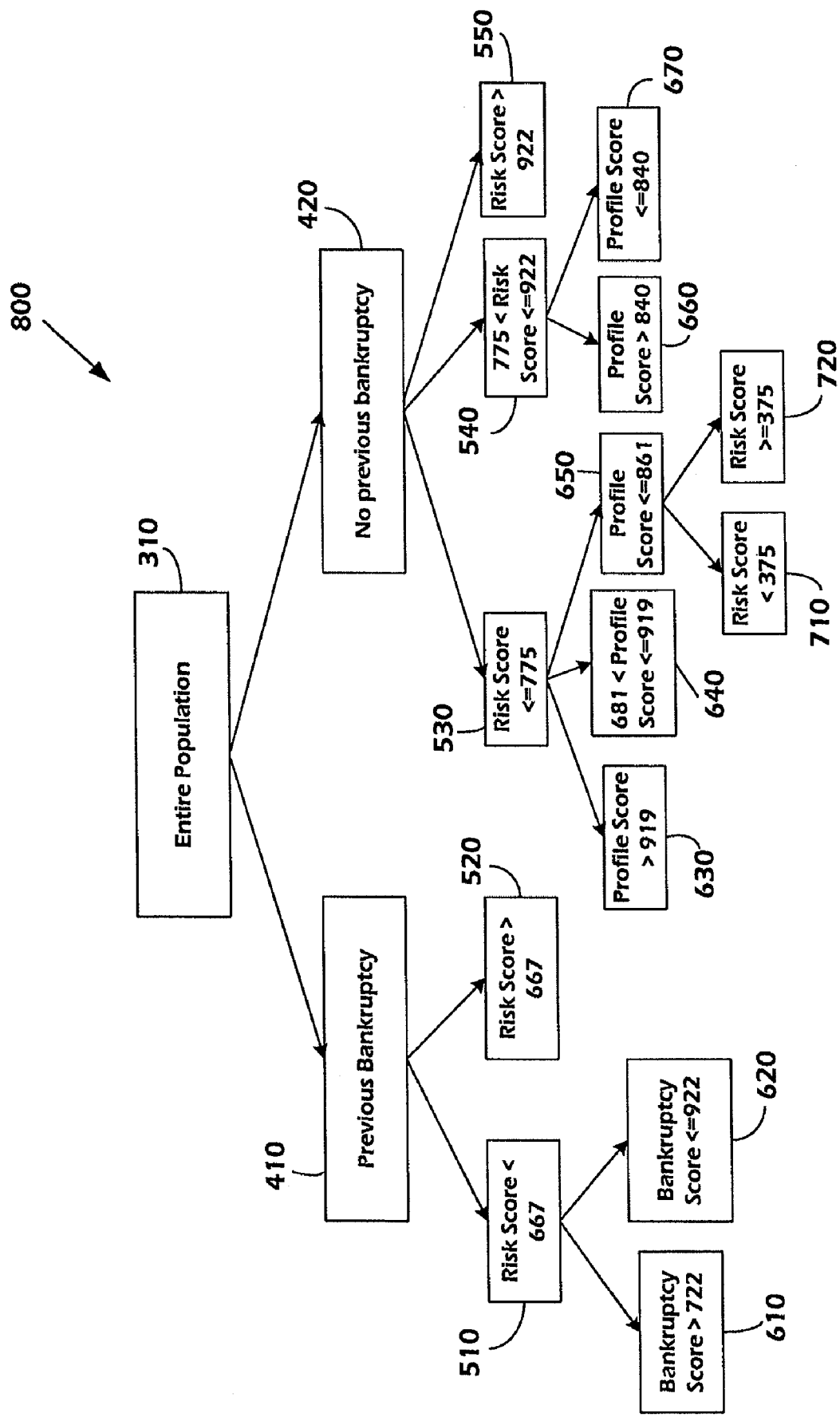
FIG. 8A illustrates another embodiment of the segmentation structure of FIG. 7 replacing the segment captions with criteria for assigning individuals to each segment.

In the embodiment of FIGS. 7 and 8, individuals assigned to the bankruptcy segment 650 may further be segmented into the higher risk segment 710 or the lower risk segment 720. In the embodiment of FIG. 8, segmentation to one of segments 710 or 720 is based upon the preliminary risk score for each individual. In the particular example of FIG. 8, those individuals having a preliminary risk score of less than seven are assigned to the higher risk segment 710, while those individuals having a preliminary risk score greater than or equal to seven are assigned to the lower risk segment 720. In one embodiment, each of the higher risk segment 710 and lower risk segment 720 are associated with a final risk score model that is applied to individuals within the respective segments in order to determine final risk scores for those individuals. FIG. 8A illustrates an additional embodiment of the segmentation structure of FIG. 7.

Figure 9:
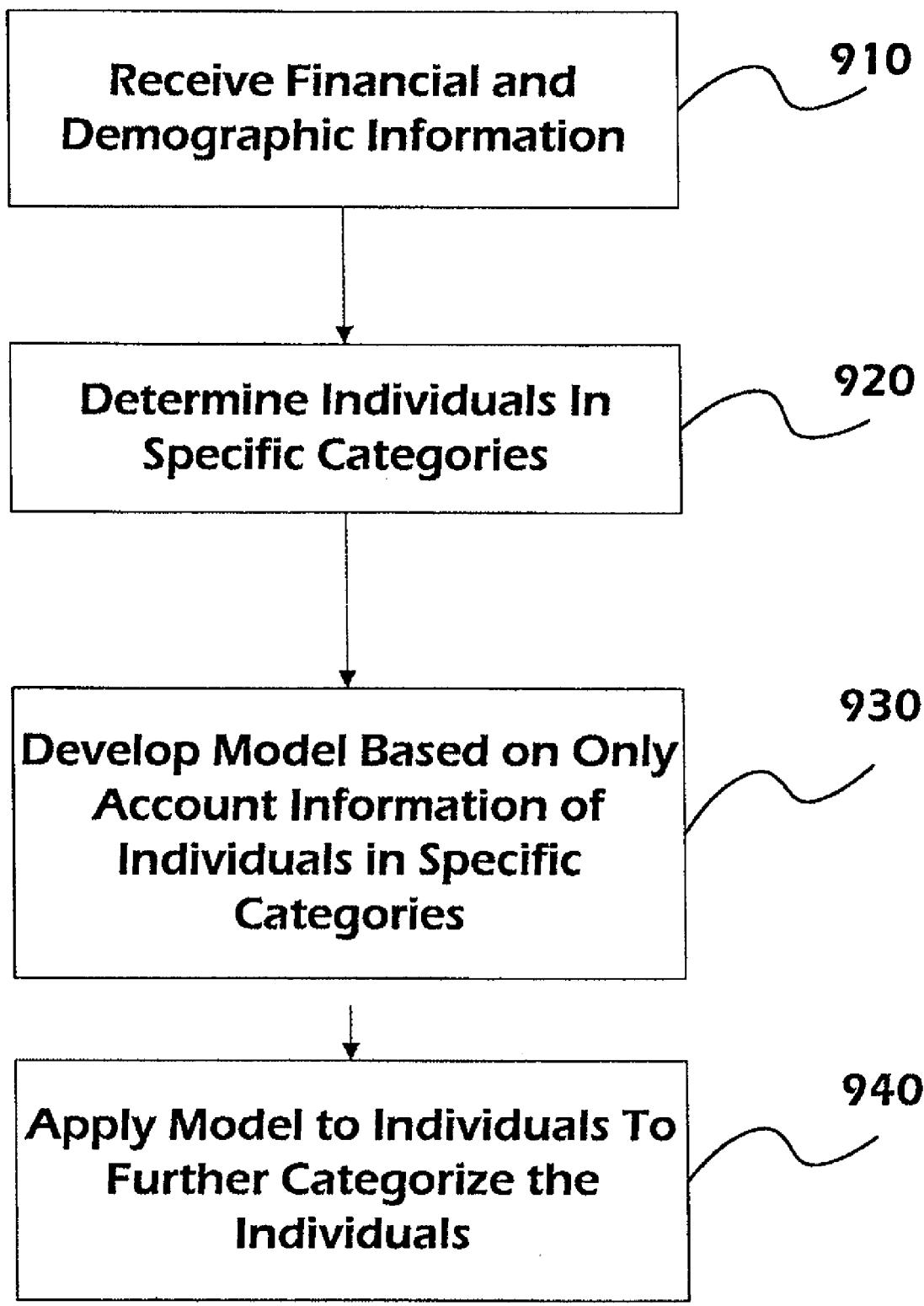
FIG. 9 is one embodiment of a flowchart illustrating an exemplary process for development of a model using financial and/or demographic information related to a subset of individuals, and application of the developed model to any individual.

FIG. 9 is one embodiment of a flowchart illustrating an exemplary process for development of a model using account information related to a subset of individuals (for example, individuals fitting a bad performance definition) and application of the developed model to any individual (for example, any individuals). This exemplary method of developing and applying a model may be stored as a process accessible by the profile module 120 and/or other components of the computing system 100. This process of generating and applying a model may be used in conjunction with various types of information. In one embodiment, models may be developed using the methodology described with reference to exemplary FIG. 9 based on data associated with two failure groups within a group of individuals fitting a bad performance definition. This model may then be applied to individuals that do not fit the bad performance definition, as well as to individuals that do fit the bad performance definition. For example, a first failure group may include individuals that have defaulted on installment loans and a second failure group may include individuals that have defaulted on revolving loans, where both failure groups fit a bad performance definition. In another embodiment, models may be developed with the methodology of FIG. 9 using information regarding the bank loans of individuals and information regarding auto loans of individuals. Depending on the embodiment, certain of the blocks described below may be removed, others may be added, and the sequence of the blocks may be altered.

In a block 910, financial and demographic information from a previous point in time, referred to as an observation point, regarding a plurality of individuals is received by a computing device, such as the computing system 100. This information may be obtained from various sources and received in various manners. In one embodiment, information may be received by the computing system 100 on a network connection with one or more financial data sources 162 and/or demographic data sources 166. In another embodiment, the financial and demographic information is retrieved by the computing system 100, such as, for example, by reading data stored on a data source connected to the network 160. In other embodiments, information may be received on a printed medium, such as through the mail, or verbally. In an advantageous embodiment, any information that is not received in an electronic format is converted to electronic format and made accessible to the computing system 100.

Next, in a block 920, behaviors of a subpopulation of individuals are observed over a set time period subsequent and mutually exclusive to the observation point. Individuals in two subcategories of a bad performance definition, such as first and second failure groups, are then selected for analysis in developing a model. For example, individuals having accounts that satisfy either default or bankruptcy criteria may be selected for use in developing a default/bankruptcy model. In another example, a first failure group may include individuals that have defaulted on an installment loan and a second failure group may include individuals that have defaulted on a revolving loan. The model generated using these failure groups may be used to determine whether an individual to which the generated model is applied is more likely to default on an installment loan or a revolving load. Additionally, models may be generated based on contrasting of data regarding individuals in other groups that are not necessarily part of a bad performance definition. Thus, the term failure group should not be construed as limited to only groups of individuals that have negative credit attributes. For example, a model may be created using information related to individuals in each of two success groups that are each part of a good performance definition. This model may then be used to determine the likelihood that an individual not fitting the good performance definition will enter the first success group or the second success group.

In a block 930, a model is developed based on only account information of the individuals in the selected one or more categories. Thus, the model is developed using account information related to only a subset of individuals, such as individuals in first and second failure groups within a bad performance definition. For example, a default/bankruptcy model may be developed using data associated with only those individuals having accounts that are classified as either bankrupt or default, although the entire population includes many other individuals that do not meet these criteria.

In a block 940, the developed model is applied to individuals using current data in order to segment individuals into groups, where each group includes individuals having one or more related attributes. In one embodiment, the developed model is applied to individuals that do not meet the criteria for the selected categories that were used in developing the model, such as individuals that fit a good performance definition. Thus, a default/bankruptcy model may be applied to individuals that are classified as neither default nor having a previous bankruptcy.

Figure 10:
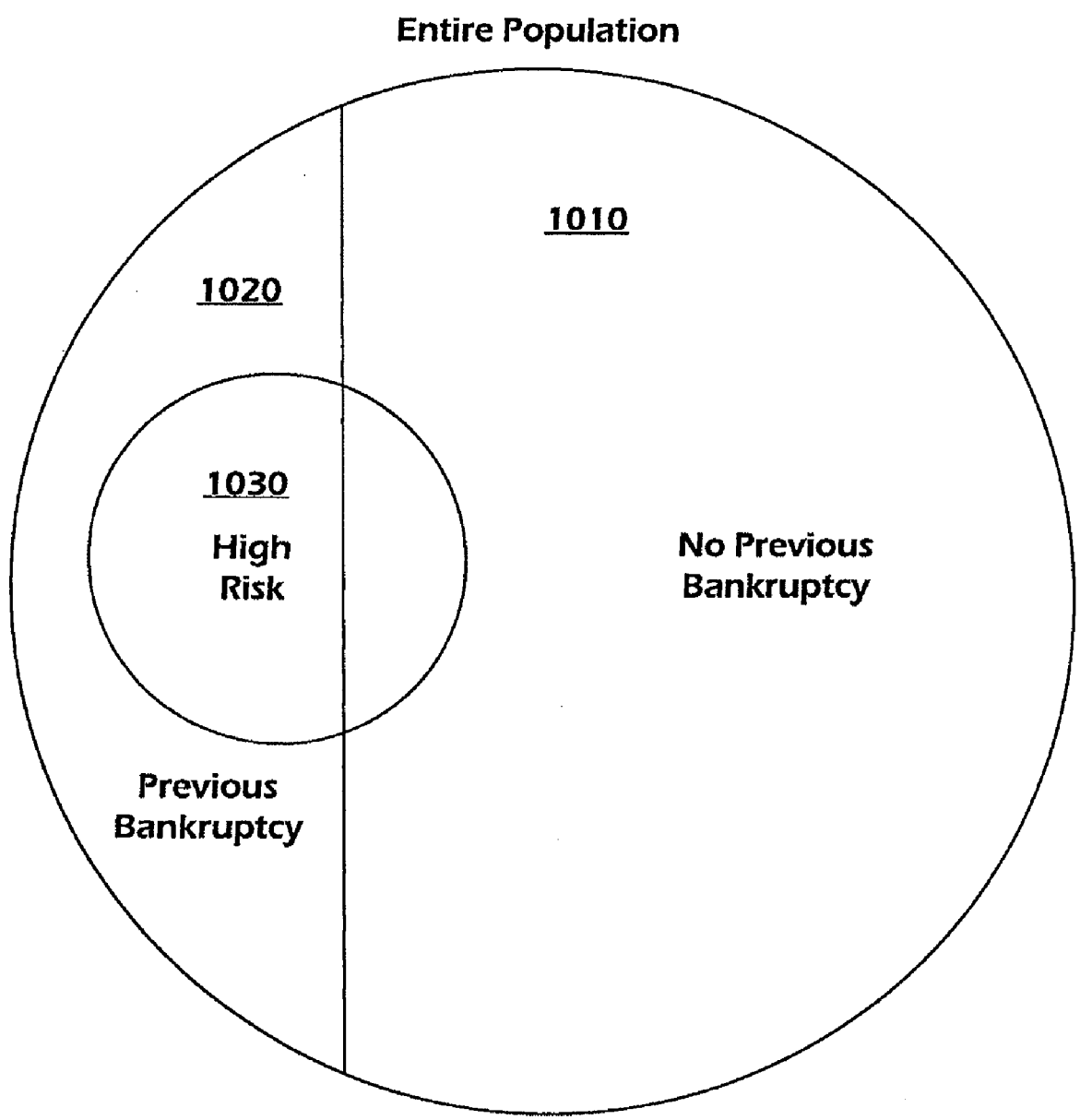
FIG. 10 is one embodiment of a Venn diagram showing an exemplary division of an entire population into previous bankruptcy and no previous bankruptcy segments, as well as a high risk segment that overlaps portions of both the previous bankruptcy and no previous bankruptcy segments.

FIG. 10 is one embodiment of a Venn diagram showing an exemplary division of an entire population into previous bankruptcy and no previous bankruptcy segments, as well as a high risk segment. As shown in FIG. 10, the entire population includes individuals with no previous bankruptcy in segment 1010, and those with a previous bankruptcy in segment 1020. Additionally, a high risk segment 1030 includes some individuals from both the previous bankruptcy segment 1020 and the no previous bankruptcy segment 1010. Thus, because there are high risk individuals in both the previous bankruptcy and no previous bankruptcy segments, a model developed using the high risk individuals and previous bankruptcy individuals may provide some predictive value to those individuals in the no previous bankruptcy segment 1010.

Figure 11:
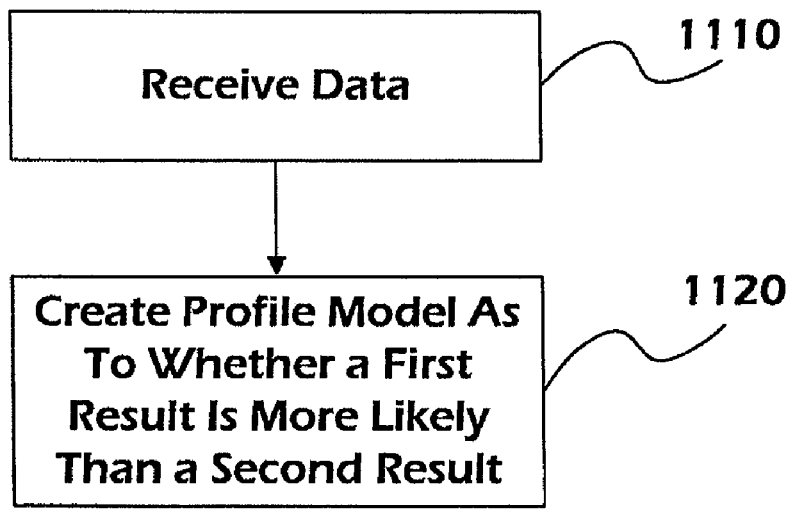
FIG. 11 is one embodiment of a flowchart showing a process of generating a model that tracks which of two or more results is most likely.

FIG. 11 is one embodiment of a flowchart showing a generic process of generating a profile model that tracks which of two or more results is more likely. The method of FIG. 11 may be applied to various types of data sets in order to predict which of two or more possible results is most likely.

For example, the methodology of FIG. 11 may be used in order to generate a model that predicts whether an individual is more likely to default on a revolving loan or if the individual is more likely to default on an installation loan. This exemplary method of generating a profile model may be stored as a process accessible by the profile module 120 and/or other components of the computing system 100. Depending on the embodiment, certain of the blocks described below may be removed, others may be added, and the sequence of the blocks may be altered.

Beginning in a block 1110, data related to accounts that are associated with one or more of the results is received. For example, if the model is intended to determine if an individual is more likely to default on installment loans or revolving loans, the data received by a computing device 100 may include financial and demographic information regarding individuals that have previously defaulted on either installment or revolving loans. Likewise, if the model is intended to determine if an individual is more likely to default on a bank loan or if the individual is more likely to default on an automobile loan, the data received by the computing device 100 may include financial and demographic information regarding individuals that have previously defaulted on either automobile or bank loans.

Continuing to a block 1120, a model that predicts whether a first result is more likely that a second result is developed based on at least a portion of the received data. In one embodiment, the data related to the multiple results is analyzed in order to detect similarities and differences in the data. Application of one or more statistical models may be used in order to analyze the data and generate a model that projects which of the multiple results is more likely based upon attributes of an individual that are later evaluated using the developed model.

Figure 12:
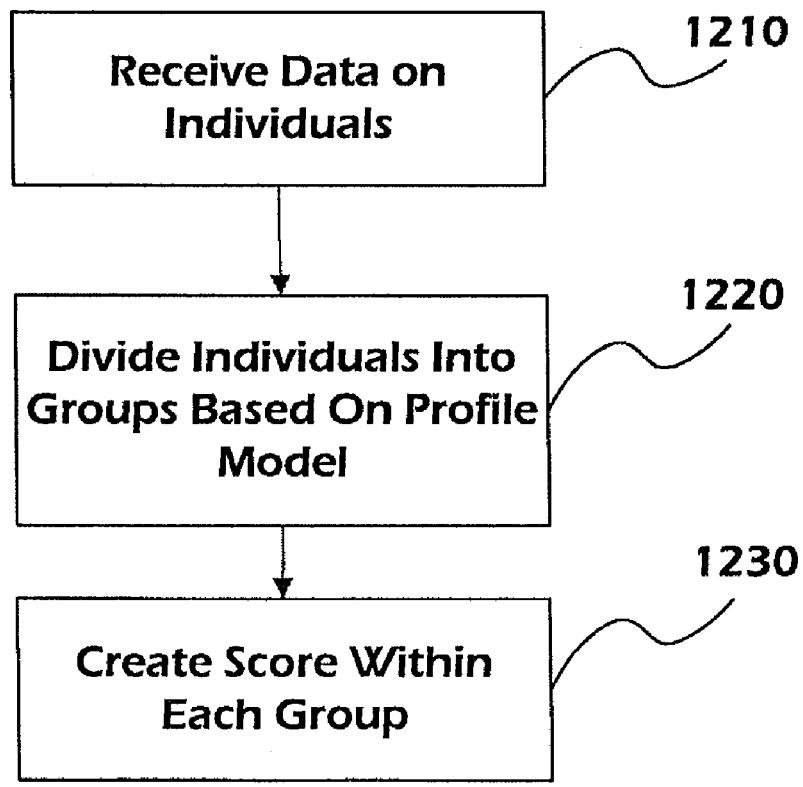
FIG. 12 is one embodiment of a flowchart showing a process of applying the model generated by the method of FIG. 11 in order to assign particular individuals to segments, where each segment may have a unique scoring model that is applied to accounts assigned to the segment.

FIG. 12 is one embodiment of a flowchart illustrating an exemplary process of applying the model generated by the method of FIG. 11 in order to assign particular individuals to segments, where each segment may have a unique scoring model that is applied to individuals assigned to that segment. This exemplary method of applying a model may be stored as a process accessible by the profile module 120 and/or other components of the computing system 100. As noted above with reference to FIGS. 3-8, segmentation of individuals into two or more segments may be useful to group individuals having one or more similar attributes, where a scoring model developed specifically for individuals having the similar attributes may be applied to individuals assigned to respective segments. Depending on the embodiment, certain of the blocks described below may be removed, others may be added, and the sequence of the blocks may be altered.

Beginning in a block 1210, data related to individuals to be scored is received. In one embodiment, the data received in block 1210 comprises financial and demographic information regarding one or more accounts related to each individual to be segmented. In other embodiments, the data regarding the individuals may comprise any other types of data that may be useful in categorizing the individuals into groups.

Continuing to a block 1220, individuals are divided into groups based on a model developed using a process similar to the process described above with reference to FIG. 11. For example, if the developed model predicts whether in individual is more likely to default on a revolving loan or a installment loan, the model may be applied to each of the individuals for which data is received in block 1210 in order to categories each of the individuals into a revolving loan group or an installment loan group. In one embodiment, the individuals that are classified using the model are not necessarily individuals that meet the criteria used for selected individuals for generation of the model. For example, a revolving/installment default model may be applied to individuals that have never defaulted on either a revolving loan or an installment loan in order to categorize the individual as either more likely to default on a revolving loan or more likely to default on and installment loan. In the embodiment of FIG. 8, for example, the default/bankruptcy model is applied to individuals in order to segment the individuals into multiple groups. In the embodiment of FIG. 8, the individuals that are categorized by the default/bankruptcy model have not previously declared bankruptcy and may not be in the default category either. Thus, the individuals on which the model is applied are not necessarily individuals that satisfy the criteria for use in model generation.

Moving to a block 1230, a score is created for each individual. In one embodiment, the scores for each individual are created based on a model that is specific to a particular segment in which the individual has been assigned. For example, if an individual is assigned to a first segment, such as through the use of a revolving/installment model score for the individual, a first scoring model may be applied to the individual in order to generate a final risk score for the individual. Likewise, if another individual is assigned to a second segment, such as through the use of the revolving/installment model score for the individual, a second scoring model may be applied to the individual in order to generate a final risk score.

Figure 13:
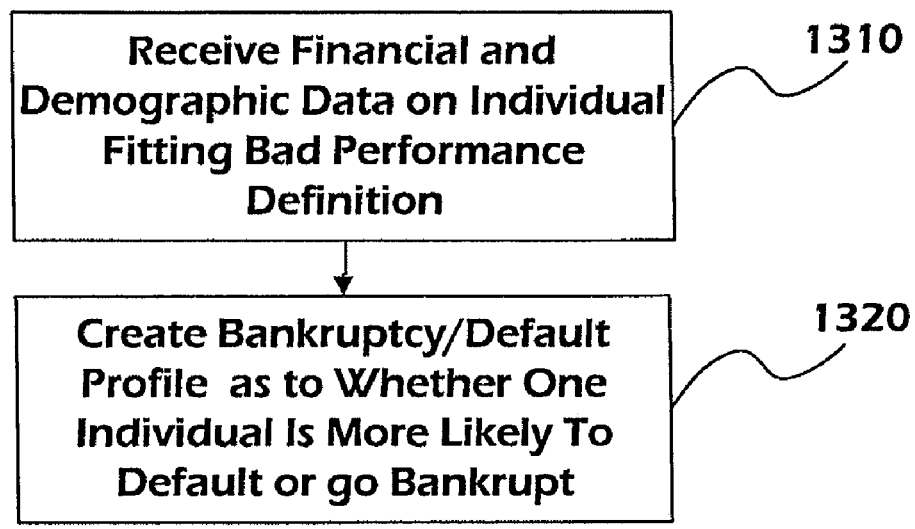
FIG. 13 is one embodiment of a flowchart showing a process of developing a default/bankruptcy profile model using only data related to individuals with accounts that are classified as default and individuals that have previously declared bankruptcy.

FIG. 13 is one embodiment of a flowchart showing a process of developing a profile model using only data regarding individuals with accounts that are classified as default and individuals that have previously declared bankruptcy. This exemplary method of developing a profile model may be stored as a process accessible by the profile module 120 and/or other components of the computing system 100. In an exemplary embodiment, the profile model uses data regarding individuals that fit a bad performance definition as measured in the outcome period in order to generate a default/bankruptcy profile model. Depending on the embodiment, certain of the blocks described below may be removed, others may be added, and the sequence of the blocks may be altered.

Beginning in a block 1310, financial and demographic data regarding individuals with default accounts and individuals that have previously filed for bankruptcy during the outcome period are received by a computing device, such as the computing system 100. As noted above, individuals may fit a bad performance definition based on various criteria, such as a number of past due accounts and a past due period for those accounts. In the embodiment described herein, individuals fit a bad performance definition if an account associated with an individual has had a 90+ day past-due status or if the individual has filed for bankruptcy within the two year outcome period.

Moving to a block 1320, a default/bankruptcy profile model as to whether an individual is more likely to default or go bankrupt is developed. The model developed by the computing system 100 in block 1320 may be applied to individuals in order to predict whether an individual is more likely to file for bankruptcy or to have a default account. In one embodiment, the model may also predict that there is a similar likelihood that the individual either declares bankruptcy or as a default account.

Figure 14:
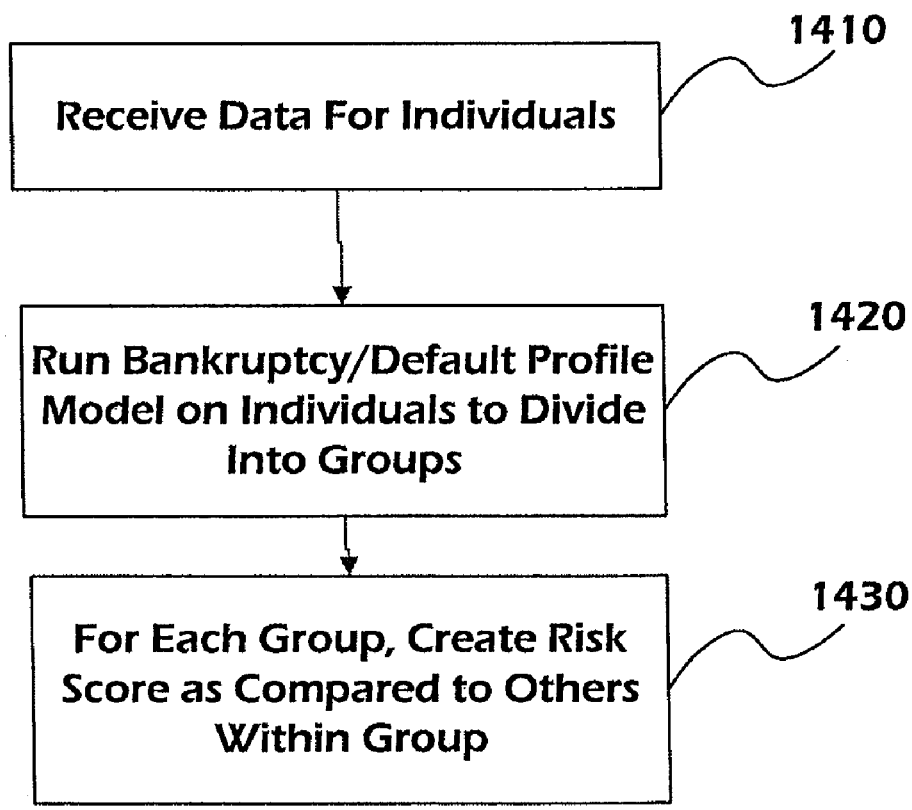
FIG. 14 is one embodiment of a flowchart showing a process of applying the default/bankruptcy profile model generated by the method of FIG. 13 in order to segment individuals.

FIG. 14 is one embodiment of a flowchart showing a process of applying the default/bankruptcy profile model to individuals. As noted above, the default/bankruptcy profile model may be applied to any individuals, regardless of whether the individuals have associated default accounts or have filed for bankruptcy. This exemplary method of applying a default/bankruptcy profile model may be stored as a process accessible by the profile module 120 and/or other components of the computing system 100. Depending on the embodiment, certain of the blocks described below may be removed, others may be added, and the sequence of the blocks may be altered.

In a block 1410, data regarding individuals to be segmented is received by the computing system 100. The received data may be received from one or more data sources, such as the financial data source 162 and the demographic data source 166.

Moving to a block 1420, the default/bankruptcy profile model is applied to individuals for which current data has been received in order to segment the individuals into two or more segments. For example, with reference to FIGS. 7 and 8, a default/bankruptcy profile model is applied to individuals in the highest risk segment 530 in order to further segment the individuals into default segment 630, default/bankruptcy segments exported, or bankruptcy segments 650. Likewise, the default/bankruptcy profile model is applied to individuals assigned to the higher risk segment 540 in order to further segment those individuals into either the default segment 660 or the bankruptcy segment 670. In this embodiment, the default/bankruptcy profile model is used only for segmenting the individuals and not specifically in the determination of a final risk score for the individuals. In other embodiments, the results of application of the default/bankruptcy profile model may be used in the development of risk scores for individuals.

Continuing to a block 1430, final risk scores are generated for the segmented individuals according to a risk score model that is particular to the segment in which each individual is assigned. For example, if an individual is assigned to the default segment 630, a risk score model that has been developed specifically for scoring those individuals that have a higher risk of defaulting, rather than going bankrupt, is applied to the individual. If an individual is assigned to the bankruptcy segment 670, a risk score model that has been developed specifically for scoring those individuals that have a higher risk of filing for bankruptcy, rather than defaulting, is applied to the individual. Thus, for each bottom segment of the segmentation structure 700, a separate risk score model may be developed and applied to individuals that are assigned to the respective segments. For example, in the embodiment of FIG. 7, the bottom segments include the higher bankruptcy risk segment 610, the lower bankruptcy risk segment 620, the lower risk segment 520, the default segment 630, the default/bankruptcy segment 640, the higher risk segment 710, the lower risk segment 720, the default segment 660, and the bankruptcy segment 670. Thus, each of these segments may include a unique risk scoring model that is applied to individuals within each respective segment. In other embodiments, a risk scoring model may be used by multiple segments in determining final risk scores.

II. Adverse Action Codes

Figure 15:
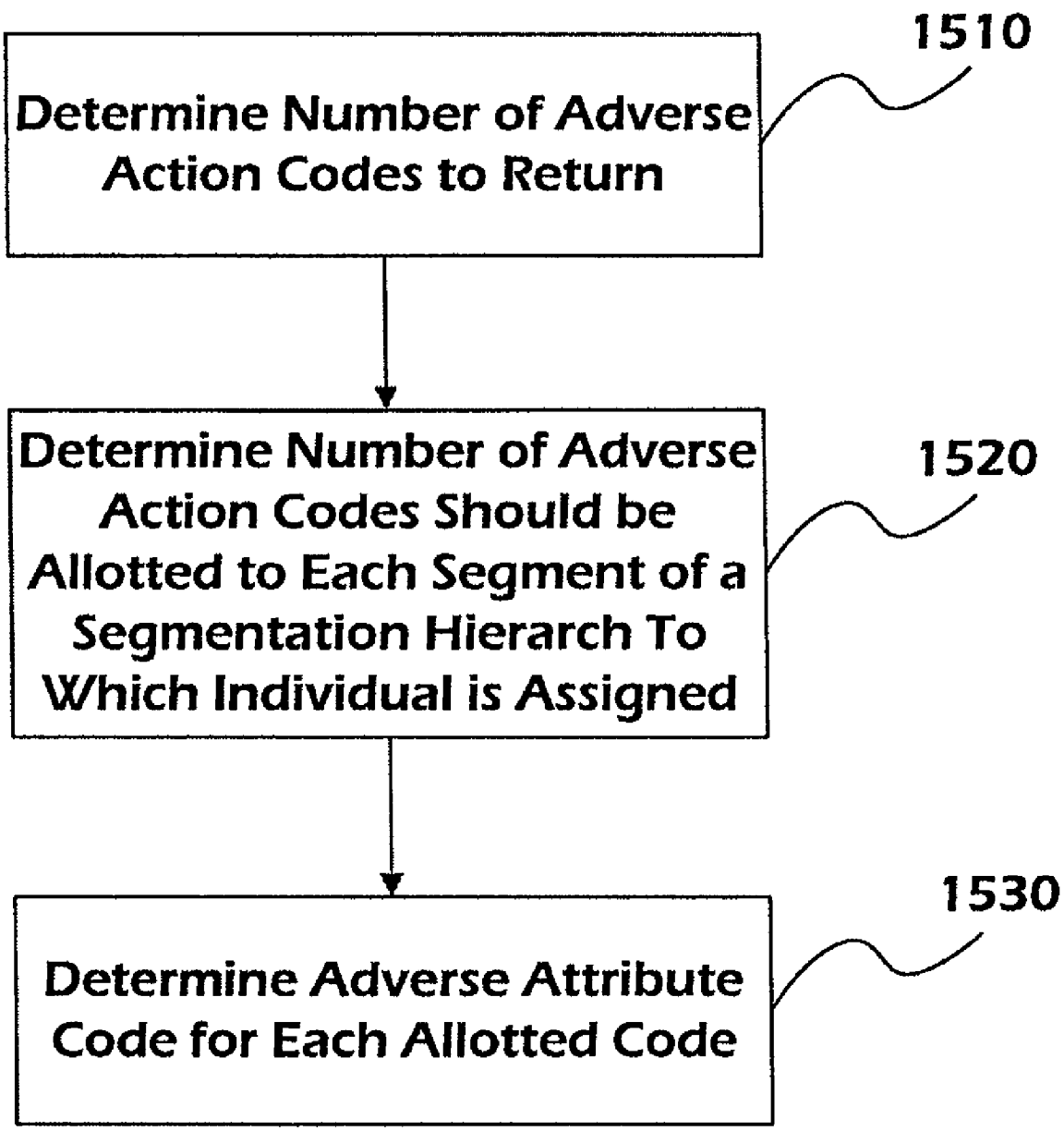
FIG. 15 is one embodiment of a flowchart illustrating an exemplary method of allocating adverse action codes to various levels of a segment hierarchy associated with an individual.

FIG. 15 is one embodiment of a flowchart illustrating an exemplary method of allocating adverse action codes to various levels of a segment hierarchy associated with an individual. In certain embodiments, after determining a segment hierarchy for an individual, a final risk score is returned and may be provided to a customer, such as the customer 164. In certain embodiments, the customer may request and/or be provided with information regarding attributes of or other information about the individual that contributed to any decreases in the final risk score. For example, if a total risk score range that may be assigned to individuals is from 0 to 100, with 100 representing the lowest risk and 0 representing the highest risk, various factors may contribute to the actual final risk score assigned to each individual. For example, the segment to which an individual is assigned may be considered in determining the final risk score. In addition, the segment hierarchy, or the parent segments to the assigned segment, may also be considered and may affect the final risk score for the individual. Thus, the risk scoring model used by the assigned segment may take into account the assigned segment and the segment hierarchy in determining a final risk score.

Figure 16:
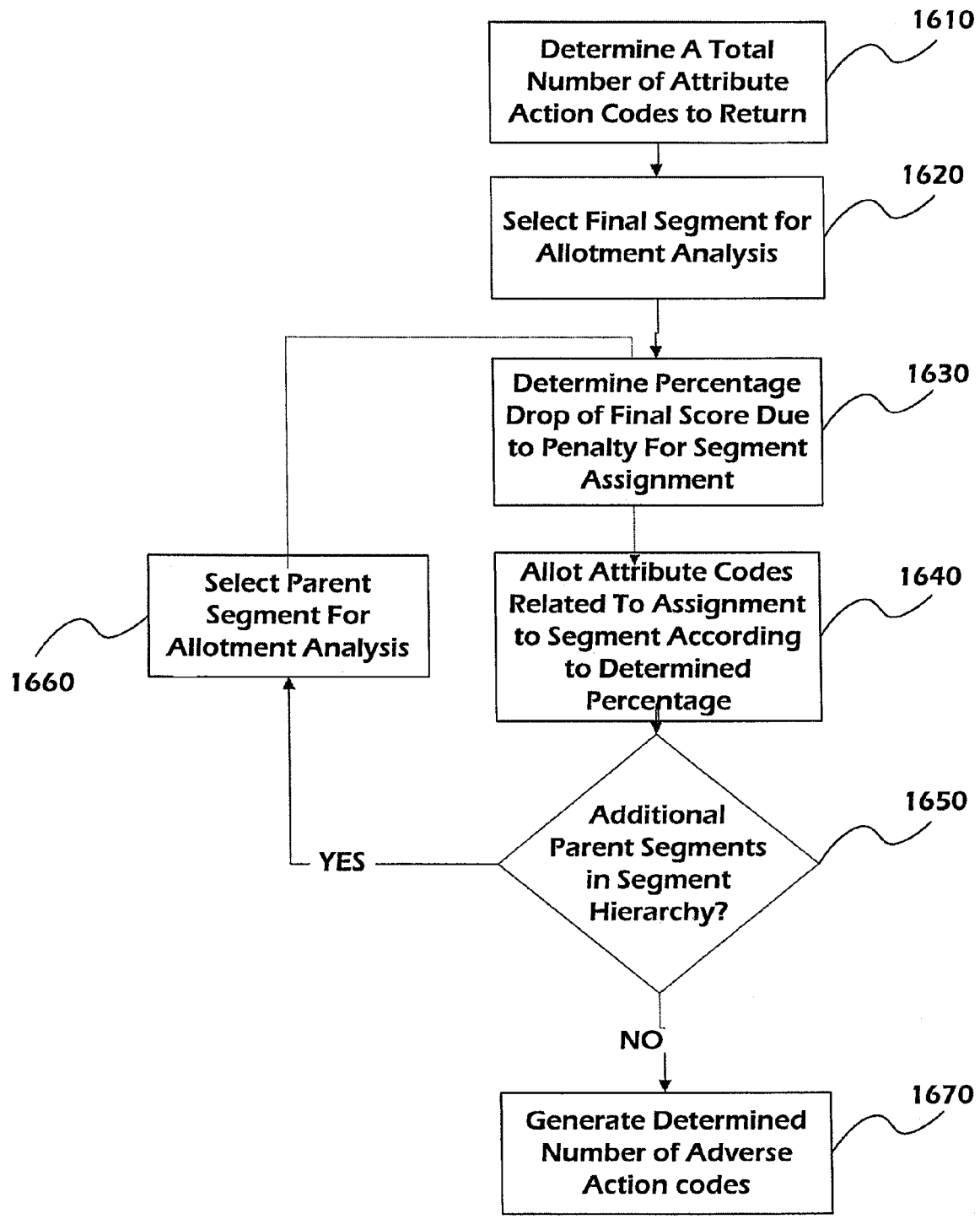
FIG. 16 is one embodiment of a flowchart illustrating an exemplary process of determining how many adverse action codes should be allotted to each level of the segment hierarchy of an individual.
Figure 17:
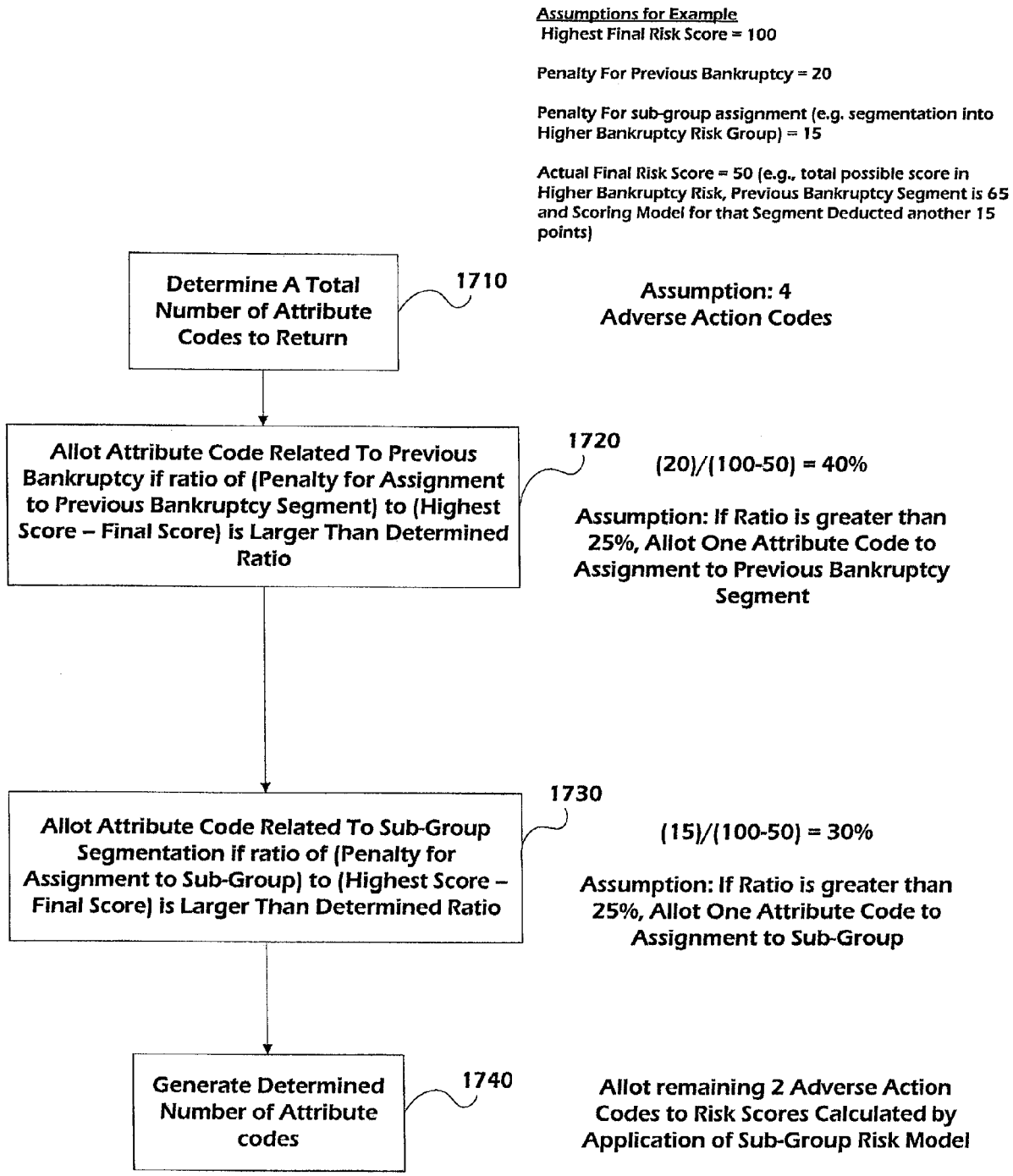
FIG. 17 is one embodiment of a flowchart illustrating an exemplary process of allocating adverse action codes to various segments in a segment hierarchy.

In one embodiment, indicators of adverse action codes are provided to the customer, where the adverse action codes indicate a specific reason as to why a final risk score for an individual is less than the maximum. In certain embodiments, adverse action code may indicate that a final risk score is less than the maximum partly because of the segment, or segment hierarchy, to which the individual was assigned. However, for different individuals, the actual affect of being assigned in a particular segment or in a segment hierarchy on the final risk score may be significantly different. For example, for a first individual, assignment to lower bankruptcy risk segment 620 (FIG. 7) may have had a larger percentage impact on the individuals final risk score than for a second individual that was also assigned to the lower bankruptcy risk segment 620. Thus, providing an adverse action code related to segmentation of the first individual may be appropriate, while providing an adverse action code related to segmentation of the second individual may not provide the most relevant information to the customer regarding reasons for the final risk score for the individual. Accordingly, described herein with respect to FIGS. 15-17 are exemplary methods of allotting adverse action codes related to segmentation of an individual based on the relevance of the segmentation decision on the final risk score assigned to the individual. Depending on the embodiment, certain of the blocks described below may be removed, others may be added, and the sequence of the blocks may be altered.

Beginning in a block 1510, a number of adverse action codes to be provided to the customer 164, for example, is determined. In one embodiment, a predetermined number of adverse action codes, such as 2, 4, 5, 6, 8, or 10 adverse action codes, are returned for each individual for which a final risk score is developed. In one embodiment, the number of adverse action codes is determined or calculated based on attributes of the particular individual being scored and/or the final risk score, and/or other characteristics related to scoring of the individual.

Continuing to a block 1520, the number of adverse action codes that should be allotted to each level of a segmentation structure in which the individual is assigned is determined. For example, one or more adverse action codes may be returned for the segment in which an individual is assigned, as well as for each of the parent segments in the segment hierarchy. The allotment of adverse action codes for various levels of a segmentation hierarchy may be determined based on several factors, such as the relative impact of assignments to each level of the segment hierarchy had on the final risk score for the individual.

Moving to a block 1530, the adverse action codes for each allotted segment are determined. In one embodiment, the adverse action code for being assigned to a particular segment comprises an indication that the individual was assigned to the particular segment. For example, an adverse action code for an individual assigned to the higher bankruptcy risk segment 610 (FIG. 7) may indicate that the individual was assigned to the higher bankruptcy risk segment. Additionally, the individual assigned to the higher bankruptcy risk segment 610 may also receive an adverse action code indicating that the individual was assigned to a higher risk segment, for example, the higher risk segment 510. However, based on the allotment of adverse action codes, neither of these segmentation adverse action codes may be reported to the customer, and all of the adverse action codes may be related to the various outputs of the scoring model associated with generation of the final risk score.

FIG. 16 is one embodiment of a flowchart illustrating an exemplary process of determining how many adverse action codes should be allotted to each level of the segment hierarchy to which an individual has been assigned.

Beginning in a block 1610, the total number of adverse action codes to provide to the customer is determined. As noted above, the number of adverse action codes returned may be a static number used for all individuals or, alternatively, may be a dynamic number that is determined based on attributes of the individual or results of one or more scoring models applied to the individual.

Continuing to a block 1620, the final segment to which the individual was assigned is selected for allotment analysis. More particularly, the segment in which the individual was assigned is selected in order to determine whether one or more of the available adverse action codes should indicate assignment to the segment.

Moving to a block 1630, a percentage drop of the final risk score for the individual due to a penalty for assignment to the selected segment is determined. In certain embodiments, assignment to a particular segment decreases a total possible final risk score that an individual may receive. For example, if a total possible final risk score for the entire population 310 (FIG. 700) is 1000, the total possible final risk score for individuals in the previous bankruptcy segment 410 may be decreased, for example by 100 points, so that the total possible final risk score for individuals segmented in the previous bankruptcy segment 410 is 900. Similarly, if an individual is then further segmented into the higher risk segment 510, the total possible final risk score for the individual may be further decreased by another penalty, for example 50 points, reducing the total possible final risk score for individuals segmented in the higher risk segment 510 to 850.

Continuing to a block 1640, the selected segment is allotted one or more adverse action codes if the percentage drop of the final risk score due to a penalty for assignment to the selected segment is within a predetermined range. For example, in one embodiment a single adverse action code may be allotted to the selected segment if the percentage drop of the final risk score due to the penalty for assignment to the selected segment is greater than 25%. In other embodiments, the percentage drop required for allocating an adverse action code to a particular segment may be lower or higher than 25%, such as 10%, 12.5%, 20%, 30%, or 50%, for example.

Moving to a decision block 1650, the computing system 100 determines if there are additional parent groups in the segmentation hierarchy to which the individual has been assigned. For example, the segmentation hierarchy for an individual assigned to the higher bankruptcy risk segment 610 includes the higher risk segment 510, the previous bankruptcy segment 410, and the entire population segment 310. Accordingly, after allotment of adverse action codes to the higher bankruptcy risk segment 610, the computing device 100 determines at block 1650 that additional parent groups in the segment hierarchy are present and additional adverse action code allotment should be considered. If additional parent groups are present, the process continues to a block 1660 where the parent group of the previously selected segment is selected for allotment analysis. For example, after allotment analysis on the higher bankruptcy risk group 610, the higher risk segment 510 is selected at block 1660 for allotment analysis. Likewise, after allotment analysis on higher risk segment 510, the previous bankruptcy segment 410 is selected for allotment analysis. After selecting the parent group for allotment analysis in block 1660, the method continues to block 1630, 1640, and 1650. Thus, the process of determining a percentage drop of the final risk score due to a penalty for assignment to a particular segment and allotment of adverse action codes based on the determined percentage may be performed for each segment in the segmentation hierarchy for the individual. After each of the segments in the segmentation hierarchy are considered for allotment analysis, the method continues from block 1650 to a block 1670, where the adverse action codes allotted to various segments are generated and provided to the customer.

Although the embodiment of FIG. 16 begins the process of allocating adverse action codes at the final segment to which the individual is assigned and moves upward through the segmentation hierarchy, it is understood that the process of allocating adverse action codes to segments may be performed in the opposite direction, or in any other order. In one embodiment, adverse action code allotment begins at the first segmentation level, with the entire population segment 310 (FIG. 7), for example, and then moves to the children nodes, such as to the previous bankruptcy segment 410, then to the higher risk segment 510, and then to the higher bankruptcy risk segment 610. In other embodiments, not all of the segments in a segmentation structure are considered for allotment of adverse action codes. For example, the entire population segment 310 and the no previous bankruptcy segment 420, among other segments, may be excluded from adverse action code allotment analysis, such as by using the process described above with reference to FIG. 16.

FIG. 17 is one embodiment of a flowchart illustrating an exemplary process of allocating adverse action codes to various segments in a segment hierarchy. FIG. 17 also includes an example of application of the general formulas described in the flowchart using exemplary data related to an exemplary individual. In the example illustrated in FIG. 17, it is assumed that the highest final risk score possible for an individual is 100, the penalty for being assigned to the previous bankruptcy segment 410 (FIG. 7) is 20, and the penalty for assignment to the higher bankruptcy risk segment 610 is 15. Thus, in the example discussed with reference to FIG. 17, for an individual assigned to the higher bankruptcy risk segment 610, the total possible final risk score is 65. For purposes of example, an individual assigned to the higher bankruptcy risk segment 610 and having a final score of 50, for example, having 15 points deducted for reasons other than being assigned to the higher bankruptcy risk segment 610, is discussed with reference to the adverse action code allotment method.

In a block 1710, a total number of adverse action codes to provide to the customer is determined. In the example of FIG. 17, 4 adverse action codes are returned to the customer.

Continuing to a block 1720, an adverse action code related to being assigned to the previous bankruptcy segment is allotted if the ratio of the penalty for assignment to the previous bankruptcy segment to the difference between the highest available final risk score and the actual final risk score is larger than a predetermined ratio. In the example of FIG. 17, the penalty for assignment to the previous bankruptcy segment is 20 and the difference between the highest final risk score and the actual final risk score is 50 (for example, 100−50=50). Thus, the determined ratio is 40%. In this example, one adverse action code is allotted to indicate segmentation to the previous bankruptcy segment if the ratio is greater than 12.5%. Because the determined ratio of 40% is greater than 12.5%, an adverse action code is assigned to indicate segmentation to the previous bankruptcy segment. In one embodiment, this allotted adverse action code returned to the customer indicates that the individual was assigned to a previous bankruptcy group and assignment to that segment had a non-trivial effect on the actual final risk score of the individual.

Moving to a block 1730, an adverse action code related to being assigned to a subgroup, or segment configured as a child of the previous bankruptcy segment, is allotted if the ratio of the penalty for assignment to the particular subgroup to the difference in the highest available final risk score and the actual final risk score is larger than a predetermined ratio. In the example of FIG. 17, the penalty for assignment to the higher bankruptcy risk segment 610 is 15 and a difference between the highest final risk score and the actual final risk score is 50 (for example, 100−50=50). Accordingly, the determined ratio is 30%. In this example, if the ratio is between 12.5% and 37.5%, one adverse action code is allotted to indicate segmentation to the subgroup; and if the ratio is greater than 37.5%, two adverse action codes are allotted to indicate segmentation to the subgroup. Using the exemplary figures provided herein, the ratio is 30% and, thus, one adverse action code is allotted for indicating segmentation to the higher bankruptcy risk segment 610.

Next, in a block 1740, the allotted adverse action codes are determined and returned to the customer. Using the exemplary figures introduced with respect to FIG. 17, one adverse action code has been allotted for indication of assignment to the previous bankruptcy segment and one adverse action code has been allotted to indicate segmentation to a subgroup, such as the higher bankruptcy risk segment 610. In one embodiment, the reported adverse action codes are derived from the characteristic that had the most negative impact on segmentation to the selected segment. Accordingly, because the total number of adverse action codes to return to the customer is four in this example, two adverse action codes may be allotted to indicate relevant information determined from the segment scoring model applied to the individual. In other examples, a different range of risk score may be used. For example, the highest final risk score may be 990 with the minimum score at 501; the penalty for a previous bankruptcy may be 190 such that the highest score for an individual with a previous bankruptcy is 800; the penalty for being in the highest bankruptcy risk is 160 such that the highest score for an individual with the highest bankruptcy risk is 550.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A computerized method of generating a default/bankruptcy model for assigning an individual to particular segments of a segmentation structure and for generating a final risk score for the individual, wherein the default/bankruptcy model may be applied to the individual's financial and demographic information to determine the individual's propensity to either default on one or more financial instruments or file for bankruptcy, the method comprising:

receiving from one or more data sources observation data comprising financial and demographic information regarding a plurality of individuals, the observation data indicating characteristics of the individuals at an observation time;

storing the observation data in a computer memory or a mass storage device;

receiving from one or more data sources outcome data comprising financial and demographic information regarding a plurality of individuals fitting a bad performance definition, wherein the outcome data comprises financial and demographic information associated with a time period beginning after the observation time;

storing the outcome data in a computer memory or a mass storage device;

generating by computer a bankruptcy/default model based on a comparison of the observation data and the outcome data, wherein the bankruptcy/default model is configured for application to financial and demographic data of an individual to determine to which of a plurality of segments in a segmentation structure a particular individual should be assigned;

storing the bankruptcy/default model in a computer memory or a mass storage device;

applying the default/bankruptcy model to a particular individual's financial and demographic information to determine a propensity of the particular individual to either default on one or more financial instruments or file for bankruptcy;

in response to the determined propensity indicating that the particular individual is more likely to file for bankruptcy than to default on one or more financial instruments,
assigning the particular individual to a first segment of the segmentation structure; and
applying a first risk score model to the particular individual's financial and demographic information to determine a final risk score of the particular individual; and in response to the determined propensity indicating that the particular individual is more likely to default on one or more financial instruments than to file for bankruptcy,
assigning the particular individual to a second segment of the segmentation structure; and
applying a second risk score model to the particular individual's financial and demographic information to determine a final risk score of the particular individual.

2. The method of claim 1, wherein the bad performance definition comprises individuals with at least one financial account that has previously had a ninety day past due status and individuals that have previously filed for bankruptcy.

3. The method of claim 1, wherein the outcome period is 24 months.

4. The method of claim 1, further comprising determining a bankruptcy/default score for the particular individual using the bankruptcy/default model.

5. The method of claim 4, wherein the segmentation structure comprises at least two hierarchal levels of segments.

6. The method of claim 4, wherein the segmentation structure comprises at least three hierarchal levels of segments.

7. The method of claim 4, wherein the bankruptcy/default score is used to assign the individual to at least a final segment and a parent segment in the segmentation structure.

8. The method of claim 1, wherein a plurality of adverse action codes are associated with the particular individual, the adverse action codes each indicating a reason as to why the final risk score was assigned to the particular individual, wherein if being assigned to the first segment or the second segment affected the final risk score by a predetermined proportion, at least one of the plurality of adverse action codes relates to assignment to the particular segment.

9. A tangible computer readable storage medium having computer-executable instructions stored thereon, the computer-executable instructions readable by a computing system comprising one or more computing devices, wherein the computer-executable instructions are executable on the computing system in order to cause the computing system to perform operations comprising:

receiving from one or more data sources observation data comprising financial and demographic information regarding a plurality of individuals, the observation data indicating characteristics of the individuals at an observation time;

storing the observation data in a computer memory or a mass storage device;

receiving from one or more data sources outcome data comprising financial and demographic information regarding a plurality of individuals fitting a bad performance definition, wherein the outcome data comprises financial and demographic information associated with a time period beginning after the observation time;

storing the outcome data in a computer memory or a mass storage device;

generating a bankruptcy/default model based on a comparison of the observation data and the outcome data, wherein the bankruptcy/default model is configured for application to financial and demographic data of an individual to determine to which of a plurality of segments in a segmentation structure a particular individual should be assigned;

storing the bankruptcy/default model in a computer memory or a mass storage device;

applying the default/bankruptcy model to a particular individual's financial and demographic information to determine a propensity of the particular individual to either default on one or more financial instruments or file for bankruptcy;

in response to the determined propensity indicating that the particular individual is more likely to file for bankruptcy than to default on one or more financial instruments,
assigning the particular individual to a first segment of the segmentation structure; and
applying a first risk score model to the particular individual's financial and demographic information to determine a final risk score of the particular individual; and in response to the determined propensity indicating that the particular individual is more likely to default on one or more financial instruments than to file for bankruptcy,
assigning the particular individual to a second segment of the segmentation structure; and
applying a second risk score model to the particular individual's financial and demographic information to determine a final risk score of the particular individual.

* * * * *